(12) United States Patent
Jung

(10) Patent No.: US 11,163,494 B2
(45) Date of Patent: Nov. 2, 2021

(54) MEMORY SYSTEM, MEMORY CONTROLLER AND OPERATING METHOD

(71) Applicant: SK hynix Inc., Gyeonggi-do (KR)

(72) Inventor: In Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 63 days.

(21) Appl. No.: 16/822,332

(22) Filed: Mar. 18, 2020

(65) Prior Publication Data

US 2021/0109675 A1    Apr. 15, 2021

(30) Foreign Application Priority Data

Oct. 11, 2019  (KR) .................. 10-2019-0126326

(51) Int. Cl.
*G06F 12/00* (2006.01)
*G06F 3/06* (2006.01)
*G06F 12/1009* (2016.01)

(52) U.S. Cl.
CPC .......... *G06F 3/0659* (2013.01); *G06F 3/0604* (2013.01); *G06F 3/064* (2013.01); *G06F 3/0673* (2013.01); *G06F 12/1009* (2013.01); *G06F 2212/657* (2013.01)

(58) Field of Classification Search
CPC .. G06F 3/0659; G06F 3/0673; G06F 12/1009; G06F 3/064; G06F 3/0604; G06F 2212/657; G06F 3/0616; G06F 3/0631; G06F 3/0614; G06F 3/0688; G06F 3/0658; G06F 12/0246; G06F 2212/7201; G11C 16/0483; G11C 16/10; G11C 16/26
See application file for complete search history.

(56) References Cited

U.S. PATENT DOCUMENTS

| | | | |
|---|---|---|---|
| 2013/0007353 A1* | 1/2013 | Shim ...................... | G11C 16/14 711/103 |
| 2016/0104539 A1* | 4/2016 | Kim ........................ | G11C 16/28 365/185.12 |
| 2016/0155516 A1* | 6/2016 | Chang .................. | G11C 16/349 714/721 |
| 2018/0276136 A1* | 9/2018 | Ji .......................... | G11C 7/1051 |
| 2019/0304562 A1* | 10/2019 | Cai ......................... | G06F 3/064 |
| 2020/0004462 A1* | 1/2020 | Kim ...................... | G06F 3/0673 |
| 2020/0341668 A1* | 10/2020 | Gonczi ................ | G06F 3/0688 |
| 2020/0341687 A1* | 10/2020 | Lee ....................... | G06F 3/0653 |
| 2021/0004323 A1* | 1/2021 | Kang ................... | G06F 12/0246 |
| 2021/0034274 A1* | 2/2021 | Muchherla .......... | G06F 11/0727 |
| 2021/0035649 A1* | 2/2021 | Muchherla ........... | G06F 3/0647 |

FOREIGN PATENT DOCUMENTS

KR   10-2018-0130140    12/2018
KR   10-2020-0043814 A   4/2020

* cited by examiner

*Primary Examiner* — John A Lane
(74) *Attorney, Agent, or Firm* — IP & T Group LLP

(57) ABSTRACT

A memory system, a memory controller and an operating method are disclosed. In a write operation of first data into a superblock, depending on a read count value of a first memory block among a plurality of memory blocks in a memory device, the write operation of the first data is controlled to be performed one of the first memory block and a second memory block among the plurality of memory blocks. As a consequence, read count values in the memory device may be distributed, and the usage rate of the memory blocks may be increased, whereby it is possible to efficiently utilize a storage space.

20 Claims, 23 Drawing Sheets

FIG.18

| Super Block #1 Read Count (RCNT) | DIE #1 | DIE #2 | DIE #3 | DIE #4 |
|---|---|---|---|---|
| | 49K | 1K | 10K | 20K |

| Super Block #1 | DIE #1 | DIE #2 | DIE #3 | DIE #4 | | | |
|---|---|---|---|---|---|---|---|
| | LBA1000 | LBA1001 | LBA1002 | LBA1003 | | | |
| | LBA1004 | LBA1005 | LBA1006 | LBA1007 | | | |
| | LBA0 | LBA1 | LBA2 | LBA3 | | | |
| | LBA10 | | | | | | |

FIG. 19

| Super Block #1 Read Count (RCNT) | DIE #1 | DIE #2 | DIE #3 | DIE #4 |
|---|---|---|---|---|
| | 49K | 1K | 10K | 20K |

| Super Block #1 | DIE #1 | DIE #2 | DIE #3 | DIE #4 |
|---|---|---|---|---|
| | LBA1000 | LBA1001 | LBA1002 | LBA1003 |
| | LBA1004 | LBA1005 | LBA1006 | LBA1007 |
| | LBA0 | LBA1 | LBA2 | LBA3 |
| | | LBA10 | | |
| | | | | |
| | | | | |

FIG. 20

| Super Block #1 Read Count (RCNT) | DIE #1 | DIE #2 | DIE #3 | DIE #4 |
|---|---|---|---|---|
| | 49K | 1K | 10K | 20K |

| Super Block #1 | DIE #1 | DIE #2 | DIE #3 | DIE #4 |
|---|---|---|---|---|
| | LBA1000 | LBA1001 | LBA1002 | LBA1003 |
| | LBA1004 | LBA1005 | LBA1006 | LBA1007 |
| | LBA0 | LBA1 | LBA2 | LBA3 |
| | DMY | LBA10 | | |
| | | | | |
| | | | | |

FIG. 21

| Super Block #1 Read Count (RCNT) | DIE #1 | DIE #2 | DIE #3 | DIE #4 |
|---|---|---|---|---|
| | 49K | 1K | 10K | 20K |

| Super Block #1 | DIE #1 | DIE #2 | DIE #3 | DIE #4 |
|---|---|---|---|---|
| | LBA1000 | LBA1001 | LBA1002 | LBA1003 |
| | LBA1004 | LBA1005 | LBA1006 | LBA1007 |
| | LBA0 | LBA1 | LBA2 | LBA3 |
| Cold Data | LBA10 | | | |

MEMORY SYSTEM, MEMORY CONTROLLER AND OPERATING METHOD

CROSS-REFERENCE TO RELATED APPLICATION

The present application claims priority under 35 U.S.C. 119(a) to Korean Patent Application No. 10-2019-0126326 filed on Oct. 11, 2019, which is incorporated herein by reference in its entirety.

BACKGROUND

1. Technical Field

Various embodiments generally relate to a memory system, a memory controller and an operating method thereof.

2. Related Art

A memory system is a storage device capable for storing data based on a request received from a host, such as a computer, a mobile terminal such as a smartphone and a tablet, or various other electronic devices. A memory system may include a device which stores data in a nonvolatile memory, such as a solid state drive (SDD), a universal flash storage (UFS) device and an embedded MMC (eMMC) device. A memory system may also include a device which stores data in a magnetic disk, such as a hard disk drive (HDD).

A nonvolatile memory may include, for example, a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM).

Typically, a memory system may include a memory controller for controlling the operations of a memory device. Generally, a memory controller may receive a command from a host, and may perform, or control an operation such as reading, writing, or erasing data with respect to a volatile memory or a nonvolatile memory included in the memory system, based on the received command.

In a conventional memory device, when a data write operation is performed, a situation may occur in which the write operation is not normally performed due to an unexpected reason. Also, in a conventional memory system, a situation may occur in which a usage rate of memory blocks in the memory device cannot be increased by a desired level.

SUMMARY

Various embodiments of the present invention are directed to a memory system, a memory controller and an operating method capable of more efficient utilization of storage space in a memory device employed by the memory system.

Also, various embodiments are directed to a memory system, a memory controller, and an operating method capable of increasing the usage rate of memory blocks in a memory device.

Further, various embodiments are directed to a memory system, a memory controller and an operating method capable of adaptively controlling a data write position depending on a read situation of storage spaces (memory blocks or memory dies) in a memory device.

Moreover, various embodiments are directed to a memory system, a memory controller and an operating method capable of preventing the concentration of the number of reads (a read count value) of a specific sub storage space among sub storage spaces (e.g., memory blocks) in a specific storage space of a memory device.

In addition, various embodiments are directed to a memory system, a memory controller and an operating method capable of controlling the number of reads (read count values) of sub storage spaces (e.g., memory blocks) in a specific storage space of a memory device to increase in a distributed manner.

Besides, various embodiments are directed to a memory system, a memory controller and an operating method capable of preventing or delaying a situation where a write operation to the entirety of a specific storage space of a memory device becomes impossible due to frequent reading of some memory blocks in the specific storage space.

According to an aspect of the present invention, of the present disclosure a memory system is provided. The memory system may include: a memory device including a plurality of memory blocks; and a memory controller configured to, in a write operation of first data into a superblock, check a read count value of a first memory block and control, depending on the read count value of the first memory block, the first data to be programmed to one of the first memory block and a second memory block.

The first memory block and the second memory block may be included in the superblock. The superblock may be an entirety or a part of the plurality of memory blocks.

In the case where the first data is hot data, the memory controller may check whether the read count value of the first memory block satisfies a predetermined specific condition, and, depending on the checked read count value of the first memory block, may control the memory device to program the first data to the first memory block or the second memory block.

In the case where the first data is determined as cold data, the memory controller may control the memory device to program the first data to the first memory block being at the current write-scheduled position.

Even in the case where the first data is determined as the hot data depending on the predetermined reference, the memory controller may check whether the read count value of the first memory block being at the current write-scheduled position satisfies a predetermined specific condition, may control, when the specific condition is not satisfied, the first data to be programmed to the first memory block, and may control, when the specific condition is satisfied, the first data to be programmed to the second memory block which is different from the first memory block.

With regard to an example of the specific condition, the memory controller may determine that the checked read count value of the first memory block does not satisfy the specific condition, when the checked read count value of the first memory block is less than a threshold value, and may determine that the checked read count value of the first memory block satisfies the specific condition, when the checked read count value of the first memory block is equal to or greater than the threshold value.

With regard to another example of the specific condition, the memory controller may determine that the checked read count value of the first memory block does not satisfy the specific condition, when a percentage occupied by the checked read count value of the first memory block over a total sum of read count values of memory blocks included in the superblock is less than a preset threshold percentage, and may determine that the checked read count value of the first memory block satisfies the specific condition, when a percentage occupied by the checked read count value of the first memory block over the total sum is equal to or greater than the threshold percentage.

The memory controller may control, when the specific condition is satisfied, data different from the first data to be programmed to the first memory block and control the first data to be programmed to the second memory block when the second memory block becomes a current write-scheduled position.

For example, the data different from the first data may be dummy data or cold data. That is, the data different from the first data may be data which may cause read requests fewer than the first data.

The memory controller may check, when a write request of the first data is provided, a hot logical address list in which logical addresses for hot data are included, may determine, when a logical address for the first data is checked as being included in the hot logical address list, the first data as the hot data, and may determine, when a logical address for the first data is checked as being not included in the hot logical address list, the first data as the cold data.

The memory controller may generate a hot logical address list based on information received from a host, and may correct the hot logical address list depending on information received from the host or event information occurring in a read operation of the memory device.

The memory controller may manage a mapping table between logical addresses and physical addresses.

In the management of the mapping table, when the checked read count value of the first memory block does not satisfy the specific condition, the memory controller may maintain a physical address mapped to a first logical address of the first data in the mapping table, as a physical address of the first memory block.

Also, in the management of the mapping table, when the checked read count value of the first memory block satisfies the specific condition, the memory controller may change a physical address mapped to a first logical address of the first data in the mapping table, to a physical address of the second memory block.

The memory device may include at least two memory dies, and the first memory block and the second memory block may be positioned in different memory dies.

According to another aspect of the present disclosure a memory controller is provided. The memory controller according to an embodiment may include: a memory interface configured to communicate with a memory device including a plurality of memory blocks; and a control circuit configured to, in a write operation of first data into a superblock, check a read count value of a first memory block and control, depending on the read count value of the first memory block, the first data to be programmed to one of the first memory block and to a second memory block. The first memory block and the second memory block may be included in the superblock. The superblock may be an entirety or a part of the plurality of memory blocks.

In the case where the first data is hot data, the control circuit of the memory controller may check whether the read count value of the first memory block satisfies a predetermined specific condition, and, depending on the checked read count value of the first memory block, may control the first data to be programmed in the first memory block or the second memory block by the memory device.

In the case where the first data is determined as cold data, the control circuit of the memory controller may control the first data to be programmed in the first memory block being at the current write-scheduled position by the memory device.

Even in the case where the first data is determined as the hot data depending on the predetermined reference, the control circuit of the memory controller may check whether the read count value of the first memory block being at the current write-scheduled position satisfies a predetermined specific condition, may control, when the specific condition is not satisfied, the first data to be programmed to the first memory block, and may control, when the specific condition is satisfied, the first data to be programmed to the second memory block which is different from the first memory block.

When the checked read count value of the first memory block is less than a threshold value, the control circuit of the memory controller may determine that the checked read count value of the first memory block does not satisfy the specific condition.

When the checked read count value of the first memory block is equal to or greater than the threshold value, the control circuit of the memory controller may determine that the checked read count value of the first memory block satisfies the specific condition.

The control circuit of the memory controller may determine that the checked read count value of the first memory block does not satisfy the specific condition, when a percentage occupied by the checked read count value of the first memory block over a total sum of read count values of memory blocks included in the superblock is less than a preset threshold percentage, and may determine that the checked read count value of the first memory block satisfies the specific condition, when a percentage occupied by the checked read count value of the first memory block over the total sum is equal to or greater than the threshold percentage.

The control circuit of the memory controller may control, when the specific condition is satisfied, data different from the first data to be programmed to the first memory block and control the first data to be programmed to the second memory block when the second memory block becomes a current write-scheduled position.

The data different from the first data may be dummy data or cold data.

The control circuit of the memory controller may check, when a write request of the first data is provided, a hot logical address list in which logical addresses for hot data are included, may determine, when a logical address for the first data is checked as being included in the hot logical address list, the first data as the hot data, and may determine, when a logical address for the first data is checked as being not included in the hot logical address list, the first data as the cold data.

The memory controller may further include an address translation module configured to manage a mapping table between logical addresses and physical addresses.

When the checked read count value of the first memory block does not satisfy the specific condition, the address translation module may maintain a physical address mapped to a first logical address of the first data in the mapping table, as a physical address of the first memory block.

When the checked read count value of the first memory block satisfies the specific condition, the address translation module may change a physical address mapped to a first logical address of the first data in the mapping table, to a physical address of the second memory block.

According still to another aspect of the present disclosure a method for operating a memory system is provided. The method for operating the memory system according to an embodiment may include: checking a read count value of a first memory block in a memory device, in a write operation of first data into a superblock; and, depending on the read count value of the first memory block, programming the first data to one of the first memory block and a second memory block. The first memory block and the second memory block may be included in the superblock. The superblock may be an entirety or a part of the plurality of memory blocks.

According still to another aspect of the present disclosure a method for operating a controller is provided. The controller may control a memory device including a plurality of memory blocks. The method for operating the controller may include: controlling the memory device to store data into the first memory block when a read count of the first memory block is less than a threshold; and controlling the memory device to store data into the second memory block when a read count of the first memory block is equal to the threshold or greater.

According to the embodiments of the present disclosure, it is possible to efficiently utilize a storage space in a memory device.

Also, according to the embodiments of the present disclosure, it is possible to increase the usage rate of memory blocks in the memory device.

Further, according to the embodiments of the present disclosure, it is possible to adaptively control a data write position depending on a read situation of storage spaces (memory blocks or memory dies) in the memory device.

Moreover, according to the embodiments of the present disclosure, it is possible to prevent the concentration of the number of reads (a read count value) of a specific sub storage space among sub storage spaces (e.g., memory blocks) in a specific storage space of the memory device.

In addition, according to the embodiments of the present disclosure, it is possible to control the numbers of reads (read count values) of sub storage spaces (e.g., memory blocks) in a specific storage space of the memory device to increase in a distributed manner.

According to the embodiments of the present disclosure, it is possible to prevent or delay a situation where a write operation to the entirety of a specific storage space of the memory device becomes impossible due to frequent reading of some memory blocks in the specific storage space.

BRIEF DESCRIPTION OF THE DRAWINGS

FIG. 18 is a diagram illustrating a case where a partial close delay control method through write position control in accordance with embodiments of the present disclosure is not applied in the superblock structure of FIG. 16.

FIGS. 19 to 21 are diagrams illustrating cases where a partial close delay control method through write position control in accordance with embodiments of the present disclosure is applied in the superblock structure of FIG. 16.

DETAILED DESCRIPTION

Figure 1:
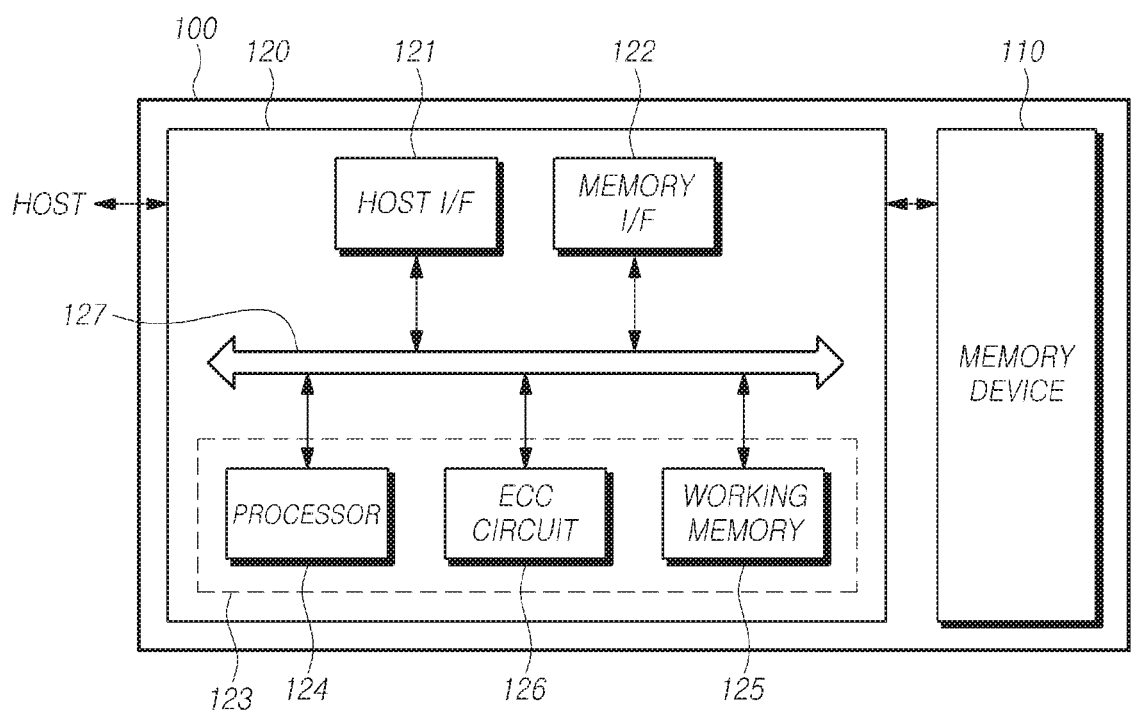
FIG. 1 is a schematic configuration diagram illustrating a memory system in accordance with embodiments of the present disclosure.

Hereinafter, embodiments of the present disclosure may be described in detail with reference to the accompanying drawings. In the following description, same elements may be designated by the same reference numerals although they are shown in different drawings. Further, in the following description of the present disclosure, a detailed description of known functions and configurations incorporated herein may be omitted when it may make the subject matter of the present disclosure rather unclear. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g., "a," "an" and "the," this may include a plural of that noun unless specifically stated otherwise.

Also, in describing the components of the present disclosure, there may be terms used like first, second, A, B, (a), and (b). These are solely for the purpose of differentiating one component from the other and do not to imply or suggest the substances, order, sequence or number of the components.

In descriptions of the positional relationships of components, in the case where it is described that at least two components are "connected," "coupled" or "linked," it is to be understood that the at least two components may be directly "connected," "coupled" or "linked" but may be indirectly "connected," "coupled" or "linked" with another component interposed between the two components. Here, another component may be included in at least one of the at least two components which are "connected," "coupled" or "linked" with each other.

In descriptions for time flow relationships of components, an operating method or a fabricating method, in the case where pre and post relationships in terms of time or pre and post relationships in terms of flow are described, for example, by "after," "following," "next" or "before," non-continuous cases may be included unless "immediately" or "directly" is used.

In the case where a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

Hereinafter, various examples of embodiments of the present disclosure may be described in detail with reference to the accompanying drawings.

FIG. 1 is a configuration diagram schematically illustrating a memory system 100 in accordance with embodiments of the present disclosure.

Referring to FIG. 1, the memory system 100 in accordance with embodiments of the present disclosure may include a memory device 110 which stores data, and a memory controller 120 which controls the memory device 110.

The memory device 110 may include a plurality of memory blocks, and operate in response to the control of the memory controller 120. Operations of the memory device 110 may include, for example, a read operation, a program operation (also referred to as a write operation), and an erase operation.

The memory device 110 may include a memory cell array including a plurality of memory cells (also simply referred to as "cells") which store data. Such a memory cell array may exist in memory blocks.

For example, the memory device 110 may be realized as any one of a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), and the like.

The memory device 110 may be realized, preferably, in a three-dimensional array structure. The embodiments of the present disclosure may be applied to not only a flash memory device in which a charge storage layer is configured by a conductive floating gate but also a charge trap flash (CTF) in which a charge storage layer is configured by a dielectric layer.

The memory device 110 is configured to receive a command, an address and so forth from the memory controller 120, and access a region in the memory cell array which is selected according to the received address. That is, the memory device 110 may perform an operation corresponding to the command, for a region selected by the address.

For example, the memory device 110 may perform a program operation, a read operation, and/or an erase operation. In this connection, in the program operation, the memory device 110 may program data to a region selected by the address. In the read operation, the memory device 110 may read data from a region selected by the address. In the erase operation, the memory device 110 may erase data stored in a region selected by the address.

The memory controller 120 may control write (program), read, erase and background operations for the memory device 110. For example, the background operation may include at least one of a garbage collection (GC) operation, a wear leveling (WL) operation, a bad block management (BBM) operation, and so forth.

The memory controller 120 may control the operation of the memory device 110 according to a request of a host. Alternatively, the memory controller 120 may control the operation of the memory device 110 regardless of a request of the host.

The memory controller 120 and the host may be devices which are separated from each other. Additionally, the memory controller 120 and the host may be realized as integrated into one device. Hereunder, it may be described as an example that the memory controller 120 and the host are devices which are separated from each other.

Referring to FIG. 1, the memory controller 120 may include a memory interface 122, a control circuit 123, and a host interface 121.

The host interface 121 provides an interface for communication with the host.

When receiving a command from the host, the control circuit 123 may receive the command through the host interface 121, and then, may perform an operation of processing the received command.

The memory interface 122 is coupled with the memory device 110 and thereby provides an interface for communication with the memory device 110. That is, the memory interface 122 may be configured to provide the interface between the memory device 110 and the memory controller 120 in response to the control of the control circuit 123.

The control circuit 123 performs the general control operations of the memory controller 120, thereby controlling the operations of the memory device 110. To this end, for instance, the control circuit 123 may include at least one of a processor 124 and a working memory 125, and as the case may be, may further include an error detection and correction circuit (ECC circuit) 126.

The processor 124 may control general operations of the memory controller 120, and may perform a logic calculation. The processor 124 may communicate with the host through the host interface 121, and may communicate with the memory device 110 through the memory interface 122.

The processor 124 may perform the function of a flash translation layer (FTL). The processor 124 may translate a logical address (LBA), provided by the host, into a physical address (PBA) through the flash translation layer (FTL). The flash translation layer (FTL) may receive the logical address (LBA) and translate the received logical address (LBA) into the physical address (PBA), by using a mapping table.

There are various address mapping methods of the flash translation layer, depending on a mapping unit. Representative address mapping methods include a page mapping method, a block mapping method and a hybrid mapping method.

The processor 124 is configured to randomize data received from the host. For example, the processor 124 may randomize data received from the host, by using a randomizing seed. Randomized data to be stored is provided to the memory device 110 and is programmed to the memory cell array.

The processor 124 is configured to derandomize data received from the memory device 110, in a read operation. For example, the processor 124 may derandomize data received from the memory device 110, by using a derandomizing seed. Derandomized data may be outputted to the host.

The processor 124 may control the operation of the memory controller 120 by executing firmware. In order to control general operations of the memory controller 120 and perform a logic calculation, the processor 124 may execute (drive) firmware loaded to the working memory 125 upon booting.

The firmware is a program to be executed in the memory system 100 and may include various functional layers.

For example, the firmware may include at least one of a flash translation layer (FTL) which performs a translating function between a logical address requested to the memory system 100 from the host and a physical address of the memory device 110, a host interface layer (HIL) which serves to analyze a command requested to the memory system 100 as a storage device from the host and transfers the command to the flash translation layer (FTL), a flash interface layer (FIL) which transfers a command instructed from the flash translation layer (FTL) to the memory device 110, and so forth.

For instance, such firmware may be stored in the memory device 110 and then be loaded to the working memory 125.

The working memory 125 may store firmware, a program code, a command and data which are necessary to drive the memory controller 120. The working memory 125, for example, as a volatile memory, may include at least one of an SRAM (static RAM), a DRAM (dynamic RAM) and an SDRAM (synchronous DRAM).

The error detection and correction circuit 126 may be configured to detect an error bit of checking target data and correct the detected error bit, by using an error correction code. Here, the checking target data may be, for example, data stored in the working memory 125, data read from the memory device 110, or the like.

The error detection and correction circuit 126 may be realized to decode data by using an error correction code. The error detection and correction circuit 126 may be realized by various code decoders. For example, a decoder which performs unsystematic code decoding or a decoder which performs systematic code decoding may be used.

For example, the error detection and correction circuit 126 may detect an error bit for each read data, in the unit of sector. Namely, each read data may be constituted by a plurality of sectors. A sector may mean a data unit smaller than a page as a read unit of a flash memory. Sectors constituting each read data may be matched with one another by an address.

The error detection and correction circuit 126 may calculate a bit error rate (BER), and may determine whether an error is correctable or not, in the unit of sector. For example, in the case where a bit error rate (BER) is higher than a reference value, the error detection and correction circuit 126 may determine that a corresponding sector is uncorrectable or a fail. On the other hand, in the case where a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer information (for example, address information) on a sector which is determined to be uncorrectable, to the processor 124.

A bus 127 may be configured to provide channels among the components 121, 122, 124, 125 and 126 of the memory controller 120. The bus 127 may include, for example, a control bus for transferring various control signals, commands and the like, a data bus for transferring various data, and so forth.

The above-described components 121, 122, 124, 125 and 126 of the memory controller 120 are for an illustration purpose only. Some of the above-described components 121, 122, 124, 125 and 126 of the memory controller 120 may be omitted, or some of the above-described components 121, 122, 124, 125 and 126 of the memory controller 120 may be integrated into one. As the case may be, in addition to the above-described components 121, 122, 124, 125 and 126 of the memory controller 120, one or more other components may be added.

Hereinbelow, the memory device 110 may be described in further detail with reference to FIG. 2.

Figure 2:
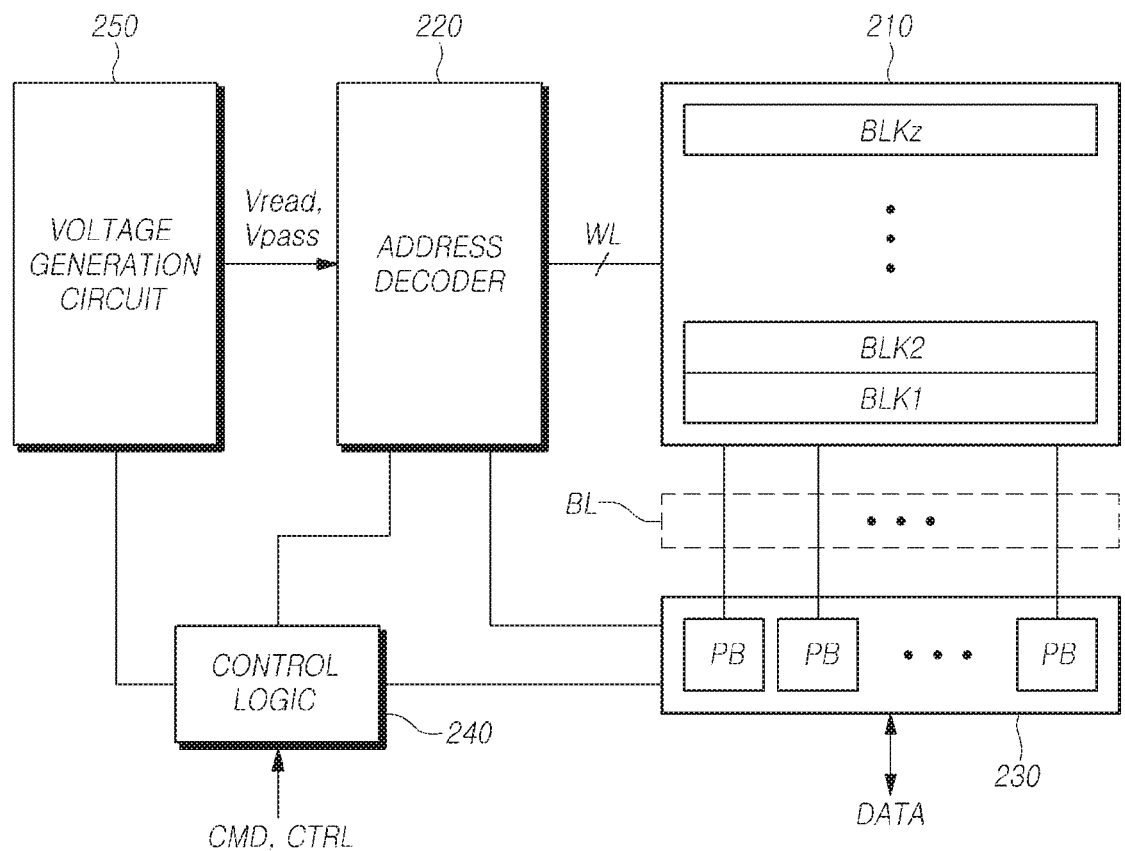
FIG. 2 is a block diagram schematically illustrating a memory device in accordance with embodiments of the present disclosure.

FIG. 2 is a block diagram schematically illustrating the memory device 110 in accordance with embodiments of the present disclosure.

Referring to FIG. 2, the memory device 110 in accordance with embodiments may include a memory cell array 210, an address decoder 220, a read and write circuit 230, a control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells which have vertical channel structures.

The memory cell array 210 may be configured by a memory cell array of a two-dimensional structure, or as the case may be, may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) which stores 1-bit data. For another instance, each of the plurality of memory cells included in the memory cell array 210 may be a multi-level cell (MLC) which stores 2-bit data. For still another instance, each of the plurality of memory cells included in the memory cell array 210 may be a triple level cell (TLC) which stores 3-bit data. For yet another instance, each of the plurality of memory cells included in the memory cell array 210 may be a quad level cell (QLC) which stores 4-bit data. For still yet another instance, the memory cell array 210 may include a plurality of memory cells, each of which stores 5 or more-bit data.

Referring to FIG. 2, the address decoder 220, the read and write circuit 230, the control logic 240 and the voltage generation circuit 250 may operate as peripheral circuits which drive the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory device 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block in a read voltage applying operation during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory device 110 may be performed in the unit of page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit which includes a plurality of page buffers PB. The read and write circuit 230 may include data buffers which take charge of a data processing function, and as the case may be, may further include cache buffers which take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, that the amounts of current flowing are changed depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. As an exemplary embodiment, the read and write circuit 230 may include a column select circuit and so forth in addition to the page buffers PB or the page registers.

The control logic 240 may be coupled with the address decoder 220, the read and write circuit 230, and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Figure 3:
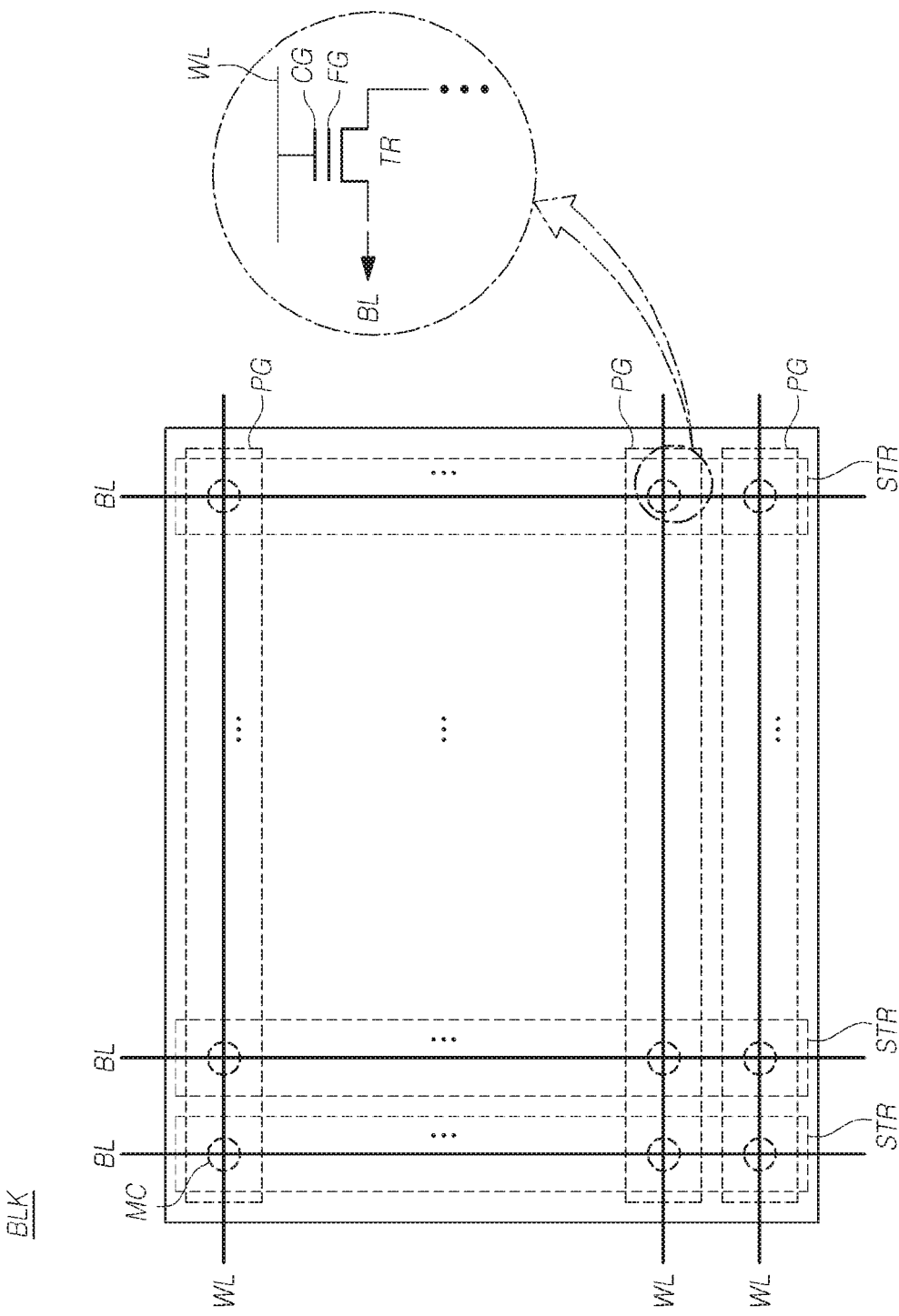
FIG. 3 is a diagram schematically illustrating an example of a memory block of a memory device in accordance with embodiments of the present disclosure.

FIG. 3 is a diagram schematically illustrating a memory block BLK of the memory device 110 in accordance with embodiments of the present disclosure.

Referring to FIG. 3, the memory block BLK included in the memory device 110 may be configured, for example, as a plurality of pages PG and a plurality of strings STR, which are disposed in directions intersecting with each other.

The plurality of pages PG may correspond to a plurality of word lines WL. The plurality of strings STR may correspond to a plurality of bit lines BL.

In the memory block BLK, the plurality of word lines WL and the plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

As the plurality of word lines WL and the plurality of bit lines BL intersect with each other, a plurality of memory cells MC may be defined. A transistor TR may be disposed in each memory cell MC.

For example, the transistor TR disposed in each memory cell MC may include a drain, a source, and a gate. The drain (or source) of the transistor TR may be coupled with a corresponding bit line BL directly or via another transistor TR. The source (or drain) of the transistor TR may be coupled with a source line (which may be the ground) directly or via another transistor TR. The gate of the transistor TR may include a floating gate FG which is surrounded by a dielectric and a control gate CG to which a gate voltage is applied from a word line WL.

In each of the plurality of memory blocks BLK1 to BLKz, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

As the case may be, at least one dummy word line may be additionally disposed between the first outermost word line and the first select line. At least one dummy word line may also be additionally disposed between the second outermost word line and the second select line.

When the memory device 110 has a memory block structure illustrated in FIG. 3, a read operation and a program operation (write operation) may be performed in the unit of page, and an erase operation may be performed in the unit of memory block.

Figure 4:
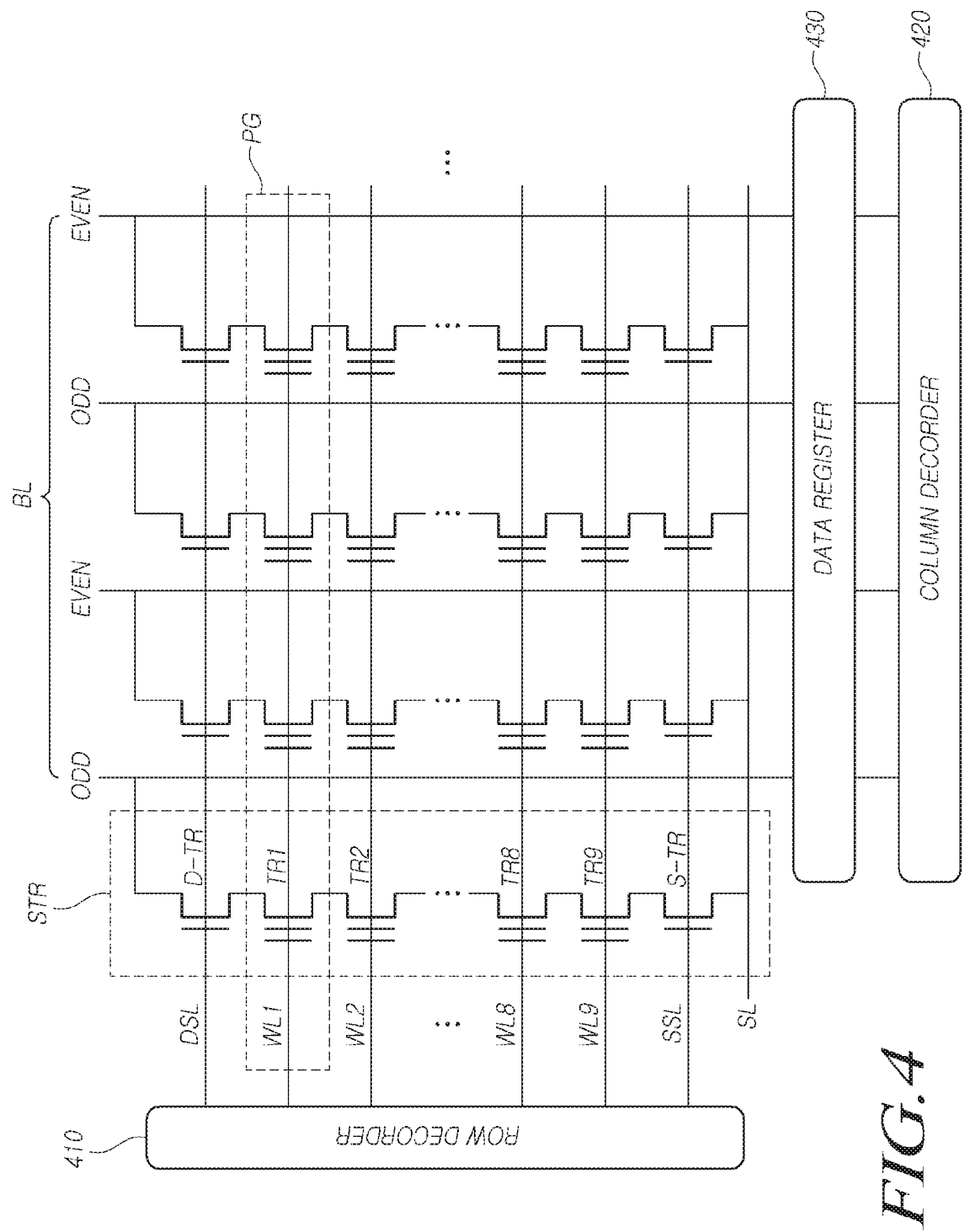
FIG. 4 is a schematic diagram illustrating a structure of word lines and bit lines of a memory device in accordance with embodiments of the present disclosure.

FIG. 4 is a diagram illustrating a structure of word lines WL and bit lines BL of the memory device 110 in accordance with embodiments of the present disclosure.

Referring to FIG. 4, in the memory device 110, there exist a core area in which memory cells MC are gathered and an auxiliary area which corresponds to the remaining area except the core area and supports the operation of the memory cell array 210.

The core area may be configured by pages PG and strings STR. In such a core area, a plurality of word lines WL1 to WL9 and a plurality of bit lines BL are disposed to intersect with each other.

The plurality of word lines WL1 to WL9 may be coupled with a row decoder 410, and the plurality of bit lines BL may be coupled with a column decoder 420. A data register 430 corresponding to the read and write circuit 230 may exist between the plurality of bit lines BL and the column decoder 420.

The plurality of word lines WL1 to WL9 correspond to a plurality of pages PG.

For example, as illustrated in FIG. 4, each of the plurality of word lines WL1 to WL9 may correspond to one page PG. In the case where the size of each of the plurality of word lines WL1 to WL9 is large, each of the plurality of word lines WL1 to WL9 may correspond to at least two (for example, two or four) pages PG. Page PG is a minimum unit used in performing a program operation and a read operation. In the program operation and the read operation, all memory cells MC in the same page PG may simultaneously perform the corresponding operations.

The plurality of bit lines BL may be coupled with the column decoder 420 while being identified as odd-numbered bit lines BL and even-numbered bit lines BL.

In order to access memory cells MC, first, an address may be entered into the core area through the row decoder 410 and the column decoder 420 via an input/output terminal, and may designate target memory cells. Designating target memory cells means accessing memory cells MC positioned at sites where the word lines WL1 to WL9 coupled with the row decoder 410 and the bit lines BL coupled with the column decoder 420 intersect with each other, to program data to the memory cells MC or read out programmed data from the memory cells MC.

A page PG in a first direction (e.g., an X-axis direction) is bound (coupled) by a common line which is referred to as a word line WL, and a string STR in a second direction (e.g., a Y-axis direction) is bound (coupled) by a common line which is referred to as a bit line BL. Being bound in common means that corresponding memory cells MC are structurally coupled with one another by the same material, and the same voltage is simultaneously applied to the memory cells MC when a voltage is applied thereto. Of course, as a memory cell MC which is coupled in series and is positioned at an intermediate position or a last position is influenced by a voltage drop in a preceding memory cell MC, voltages applied to a first memory cell MC and a last memory cell MC may be slightly different from each other.

Since data is programmed and read via the data register 430 in all data processing operations of the memory device 110, the data register 430 plays a key role. If data processing of the data register 430 is delayed, all of the other areas need to wait until the data register 430 completes the data processing. Also, if the performance of the data register 430 is degraded, the overall performance of the memory device 110 may be degraded.

Referring to the illustration of FIG. 4, in one string STR, a plurality of transistors TR1 to TR9 which are coupled with the plurality of word lines WL1 to WL9 may exist. Areas where the plurality of transistors TR1 to TR9 exist correspond to memory cells MC. The plurality of transistors TR1 to TR9 are transistors each of which includes a control gate CG and a floating gate FG as described above.

The plurality of word lines WL1 to WL9 include two outermost word lines WL1 and WL9. A first select line DSL may be additionally disposed outside a first outermost word line WL1 which is more adjacent to the data register 430 in terms of signal path between the two outermost word lines WL1 and WL9, and a second select line SSL may be additionally disposed outside a second outermost word line WL9 between the two outermost word lines WL1 and WL9.

A first select transistor D-TR which is on-off controlled by the first select line DSL is a transistor which has only a gate electrode coupled with the first select line DSL and does not include a floating gate FG. A second select transistor S-TR which is on-off controlled by the second select line SSL is a transistor which has only a gate electrode coupled with the second select line SSL and does not include a floating gate FG.

The first select transistor D-TR serves as a switch which turns on or off the coupling between a corresponding string STR and the data register 430. The second select transistor S-TR serves as a switch which turns on or off the coupling between the corresponding string STR and a source line SL. That is, the first select transistor D-TR and the second select transistor S-TR are positioned at both ends of the corresponding string STR, and serve as gatekeepers which couple and decouple signals.

In a program operation, because it is necessary to fill electrons in a target memory cell MC of a bit line BL which is to be programmed, the memory system 100 turns on the first select transistor D-TR by applying a predetermined turn-on voltage Vcc to the gate electrode of the first select transistor D-TR, and turns off the second select transistor S-TR by applying a predetermined turn-off voltage (e.g., 0V) to the gate electrode of the second select transistor S-TR.

In a read operation or a verify operation, the memory system 100 turns on both the first select transistor D-TR and the second select transistor S-TR. Accordingly, since current may be discharged to the source line SL corresponding to the ground through the corresponding string STR, a voltage level of the bit line BL may be measured. However, in the read operation, there may be a time difference between on-off timings of the first select transistor D-TR and the second select transistor S-TR.

In an erase operation, the memory system 100 may supply a predetermined voltage (e.g., +20V) to a substrate through the source line SL. In the erase operation, the memory system 100 floats both the first select transistor D-TR and the second select transistor S-TR, thereby providing infinite resistance. Accordingly, the memory system 100 is structured such that the first select transistor D-TR and the second select transistor S-TR do not function and electrons may operate due to a potential difference only between a floating gate FG and the substrate.

Figure 5:
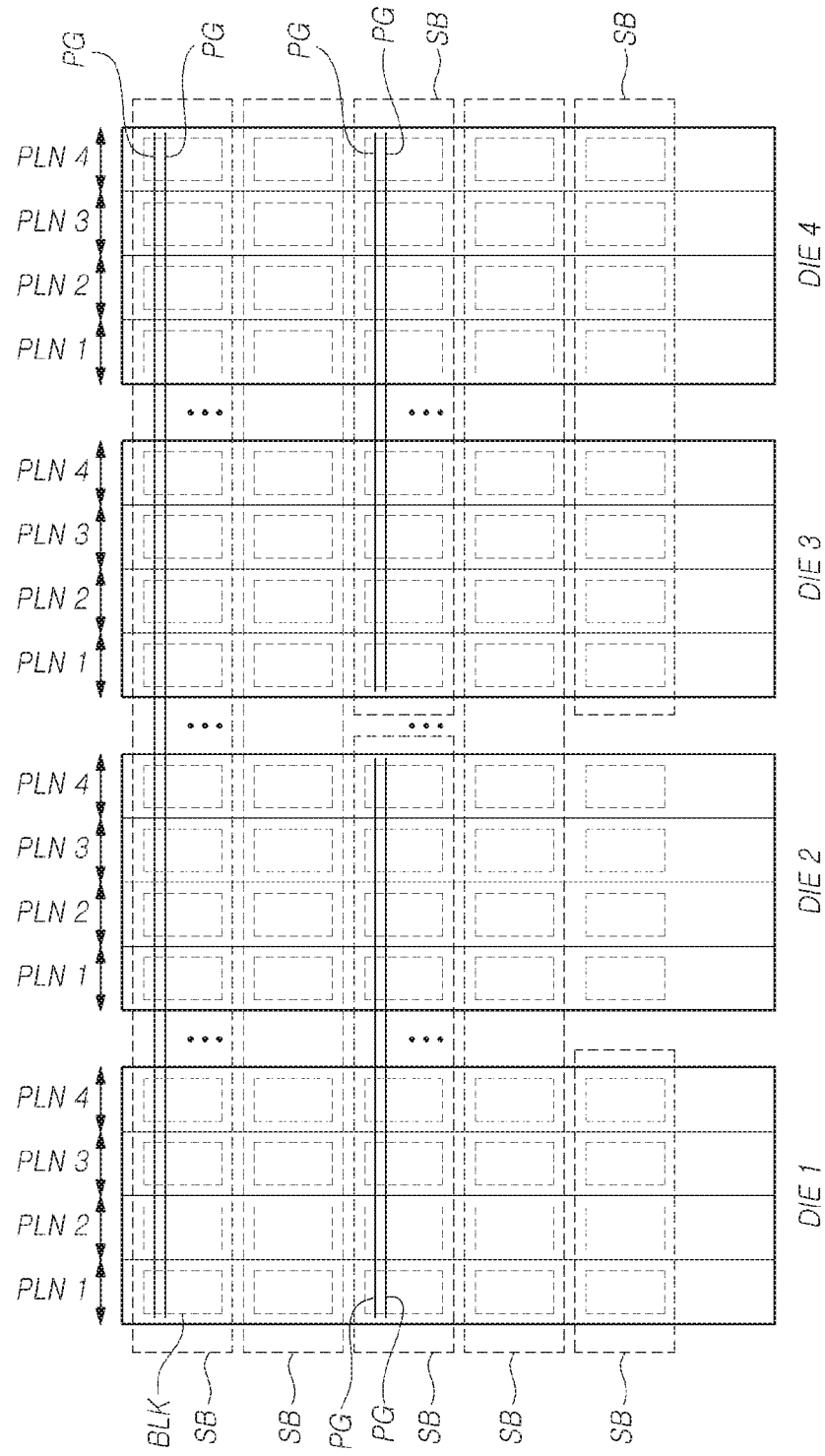
FIG. 5 is a schematic diagram illustrating a superblock-based management structure of a memory device in accordance with embodiments of the present disclosure.

FIG. 5 is a diagram illustrating a superblock-based management structure of the memory device 110 in accordance with embodiments of the present disclosure.

The memory device 110 may include one memory die, or may include at least two memory dies. The illustration of FIG. 9 corresponds to a case where the memory device 110 includes four memory dies DIE 1, DIE 2, DIE 3 and DIE 4.

Each of the four memory dies DIE 1, DIE 2, DIE 3 and DIE 4 may include one plane, or may include at least two planes. The illustration of FIG. 5 corresponds to a case where each of the four memory dies DIE 1, DIE 2, DIE 3 and DIE 4 includes four planes PLN 1, PLN 2, PLN 3 and PLN 4.

The memory device 110 may include a plurality of memory blocks BLK. Further, as illustrated in FIG. 3, each of the plurality of memory blocks BLK may include a plurality of pages PG.

According to the illustration of FIG. 5, in each of the four memory dies DIE 1, DIE 2, DIE 3 and DIE 4 of the memory device 110, each of the four planes PLN 1, PLN 2, PLN 3 and PLN 4 may include a plurality of memory blocks BLK. Further, in each of the four planes PLN 1, PLN 2, PLN 3 and PLN 4, each of the plurality of memory blocks BLK may include a plurality of pages PG.

Referring to FIG. 5, the plurality of memory blocks BLK included in the memory device 110 may be grouped into at least two superblocks SB.

A superblock SB is a unit in which the memory system 100 manages the plurality of memory blocks BLK included in the memory device 110.

One superblock SB may be a set of memory blocks BLK for which a read operation and/or a write operation are/is performed simultaneously or at the same time slot, or a read operation and/or a write operation are/is performed together. Additionally, one superblock SB may be a set of memory blocks BLK for which a read operation and/or a write operation are/is performed in response to a single command received from the host by the memory controller 120.

Furthermore, among a plurality of memory blocks BLK, a group of memory blocks BLK which are distinguished from each other in terms of management or operation may be defined as a superblock SB.

The size of the superblocks SB may be the same. That is, the number of memory blocks BLK included in the superblocks SB may be the same.

Alternatively, at least one of the superblocks SB may be different in size from the rest. That is, the number of memory blocks BLK included in at least one superblock SB among a plurality of superblocks SB may be different from the number of memory blocks BLK included in the remaining superblocks SB.

Also, all of the memory blocks BLK included in each of at least two superblocks SB respectively may be positioned in the same memory die.

Alternatively, at least two memory blocks BLK included in each of at least two superblocks SB may be positioned in at least two memory dies which are different from each other.

An area corresponding to one superblock SB may include a plurality of pages PG, and the plurality of respective pages PG may exist over the one superblock SB. For example, in the case of a superblock SB which exists over four memory dies DIE 1, DIE 2, DIE 3 and DIE 4, a plurality of respective pages PG which are disposed in an area corresponding to the superblock SB may be disposed over the four memory dies DIE 1, DIE 2, DIE 3 and DIE 4. In another example, in the case of a superblock SB which exists over two memory dies DIE 1 and DIE 2, a plurality of respective pages PG which are disposed in an area corresponding to the superblock SB may be disposed over the two memory dies DIE 1 and DIE 2.

In each of at least two superblocks SB in the memory device 110, a read operation and/or a write operation may be independently performed. In particular, a write position sequence in each of at least two superblocks SB in the memory device 110 may be determined based on a plurality of pages PG in each of the at least two superblocks SB. For example, in the case of a superblock SB which exists over four memory dies DIE 1, DIE 2, DIE 3 and DIE 4, according to write position sequence information known in advance, writes in the memory dies DIE 1, DIE 2, DIE 3 and DIE 4 in the corresponding superblock SB may be sequentially performed with respect to one page PG. Thereafter, a page number may be increased, and writes in the memory dies DIE 1, DIE 2, DIE 3 and DIE 4 in the corresponding superblock SB may be sequentially performed with respect to a next page PG corresponding to an increased page number.

In the memory system 100 in accordance with embodiments of the present disclosure, if repeated reads are performed on a specific memory block BLK in the memory device 110, a read reclaim of migrating data from the corresponding memory block BLK to another memory block BLK may be performed.

For example, in the case of a closed superblock for which a new write cannot be performed anymore, if a read count value reaches a first threshold value (e.g., 250K), a read reclaim may be caused. In the case of an open superblock for which a new write may be performed, if a read count value reaches a second threshold value (e.g., 50K), the read reclaim may be caused. The read reclaim on the open superblock may be caused earlier than the closed superblock when the second threshold is less than the first threshold.

When reads are repeatedly performed at a specific position (a specific memory block) of an open superblock SB, a situation may occur in which no more new writes may be performed on any one memory block BLK in the corresponding superblock SB and accordingly, no more new writes may be performed for the entirety of the corresponding superblock SB. Such a situation is referred to as a partial close.

If a partial close occurs, the performance of the memory system 100 may be degraded, and the usage rate of the memory block BLK may decrease.

That is, even though there exists an open memory block BLK among memory blocks BLK included in an open superblock SB, a read reclaim may be caused by frequent read operations for a specific memory block BLK, and the corresponding superblock SB may be partially closed. This may cause problems in terms of block use and garbage collection.

The above-described partial close phenomenon is highly likely to occur in the case where data likely to be frequently read is written in a memory block BLK whose read count value is already considerably high.

In this consideration, the embodiments of the present disclosure discloses a partial close delay control method capable of preventing a read count value of a specific memory block BLK from excessively increasing in comparison with other memory blocks BLK, thereby delaying or preventing the occurrence of a read reclaim and a partial close phenomenon.

Namely, the embodiments of the present disclosure disclose a partial close delay control method capable of delaying or preventing a time point at which a partial close phenomenon of an open superblock SB occurs due to intensive reading of a specific memory block BLK in the corresponding superblock SB.

By such a partial close delay control method, it is possible to identify not only a time point at which a partial close occurs but also a time point at which a read reclaim is caused, and to increase the possibility for an open superblock to become a normal closed superblock which is entirely written.

In the following, the partial close delay control method in accordance with embodiments of the present disclosure may be described in further detail.

Figure 6:
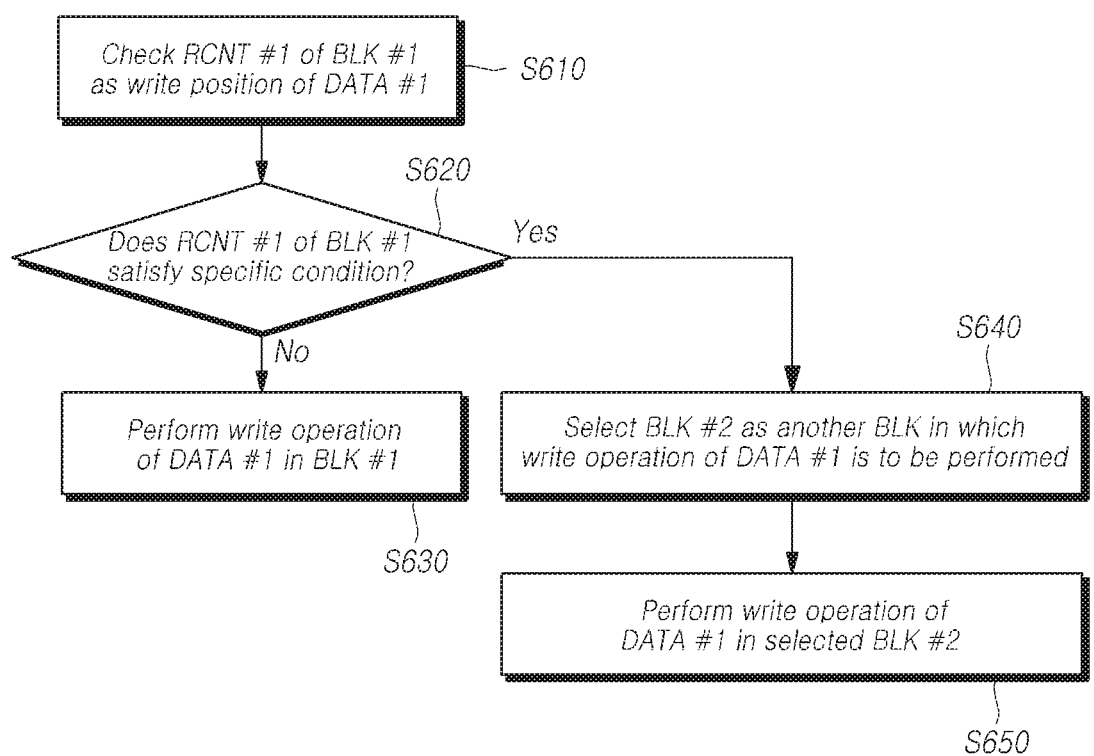
FIG. 6 is a flow chart illustrating a partial close delay control method of a memory system in accordance with embodiments of the present disclosure.

FIG. 6 is a flow chart illustrating a partial close delay control method of the memory system 100 in accordance with embodiments of the present disclosure.

Referring to FIG. 6, in a write operation of first data DATA #1, when it is checked (determined) that a current write-scheduled position according to a predefined write position sequence is a first memory block BLK #1 among the plurality of memory blocks BLK in the memory device 110, the memory system 100 in accordance with embodiments of the present disclosure checks a read count value RCNT #1 of the first memory block BLK #1 as the current write-scheduled position (S610).

The first data DATA #1 may be hot data which may be read more frequently than other data depending on a predetermined reference (e.g., a read request count). For example, hot data may be data which is expected to be read-requested by at least a threshold read request count or data which has already been read-requested by at least the threshold read request count. The hot data which is expected to be read-requested by at least the threshold read request count may mean data whose read request count is not substantial currently but is expected to be increased in the future. For example, the memory controller 120 may determine such hot data from information provided from the host. Before the partial close delay control, the first memory block BLK #1 determined as the current write-scheduled position according to the predefined write position sequence and thus corresponding to a write position of the first data DATA #1 may be an arbitrary memory block among the plurality of memory blocks BLK. The predefined write position sequence may be determined by various methods such as, for example, a sequential decision method. In the present specification, the write operation (program operation) of the first data DATA #1 may include initially writing (programming) the first data DATA #1 to the memory device 110. Alternatively, the write operation of the first data DATA #1 may be a migration operation (a type of write operation) which attempts to migrate the first data DATA #1 already written to a certain memory block in the memory device 110 to another memory block (e.g., BLK 1).

The fact that the first data DATA #1 may be read more frequently than other data may be determined based on the read frequency information of the first data DATA #1. For example, the read frequency information for each data may include a read count value that is updated each time the data is read. The read frequency information for each data may be stored in the host, the memory controller 120 or the memory device 110.

As described above, the memory controller 120 in the memory system 100 knows the write position sequence information in advance. For example, according to the write position sequence information known in advance, writes are sequentially performed on all the memory dies DIE 1, DIE 2, DIE 3 and DIE 4 for one page (e.g., PG 1). Thereafter, a page number may be increased, and writes may be sequentially performed on all of the memory dies DIE 1, DIE 2, DIE 3 and DIE 4 for a page (e.g., PG 2) corresponding to an increased page number. For example, for one page (e.g., PG 1) which spans one superblock SB, writes are sequentially performed in the sequence of a first memory block of the first memory die DIE 1, a first memory block of the second memory die DIE 2, a first memory block of the third memory die DIE 3 and a first memory block of the fourth memory die DIE 4.

Referring to FIG. 6, the memory system 100 in accordance with embodiments of the present disclosure determines whether the checked read count value RCNT #1 of the first memory block BLK #1 satisfies a specific condition (S620).

The specific condition may be a condition indicating whether read operations for the first memory block BLK #1 have been performed too frequently.

For example, when a first superblock includes a plurality of memory blocks BLK #1, BLK #2, BLK #3 and BLK #4 including the first memory block BLK #1, the specific condition may be met when the read count value RCNT #1 of the first memory block BLK #1 is equal to or greater than at least a predefined threshold percentage with respect to the total sum of read count values of the plurality of respective memory blocks BLK #1, BLK #2, BLK #3 and BLK #4 in the first superblock.

Accordingly, the read count value RCNT #1 of the first memory block BLK #1 satisfies the specific condition when the percentage of the read count value RCNT #1 of the first memory block BLK #1 is at least equal to or greater than at least the predefined threshold percentage with respect to the total sum of the read count values of the plurality of respective memory blocks BLK #1, BLK #2, BLK #3 and BLK #4 in the first superblock.

On the other hand, the read count value RCNT #1 of the first memory block BLK #1 does not satisfy the specific condition when the read count value RCNT #1 of the first memory block BLK #1 is less than the predefined threshold percentage with respect to the total sum of the read count values of the plurality of respective memory blocks BLK #1, BLK #2, BLK #3 and BLK #4 in the first superblock.

For another example, the specific condition may be when the read count value RCNT #1 of the first memory block BLK #1 is equal to or greater than a predefined threshold value.

Thus, the read count value RCNT #1 of the first memory block BLK #1 satisfies the specific condition when the read count value RCNT #1 of the first memory block BLK #1 is equal to or greater than the predefined threshold value.

On the other hand, the read count value RCNT #1 of the first memory block BLK #1 does not satisfy the specific condition when the read count value RCNT #1 of the first memory block BLK #1 is less than the predefined threshold value.

Referring to FIG. 6, if the read count value RCNT #1 of the first memory block BLK #1 does not satisfy the specific condition as a result of step S620, the memory system 100 in accordance with embodiments of the present disclosure does not change the write position of the first data DATA #1.

That is, if the read count value RCNT #1 of the first memory block BLK #1 does not satisfy the specific condition as a result of step S620, the memory system 100 in accordance with embodiments of the present disclosure controls the first data DATA #1 to be programmed in the first memory block BLK #1, according to the read count value RCNT #1 of the first memory block BLK #1 (S630).

Referring to FIG. 6, if the read count value RCNT #1 of the first memory block BLK #1 satisfies the specific condition as a result of step S620, the memory system 100 in accordance with embodiments of the present disclosure changes the write position of the first data DATA #1.

Accordingly, the memory system 100 in accordance with embodiments of the present disclosure selects a second memory block BLK #2 among the plurality of memory blocks BLK, as a new write position of the first data DATA #1 (S640), and controls the first data DATA #1 to be programmed in the second memory block BLK #2 selected as the new write position (S650).

Changing a write position and writing data at a changed write position for the partial close delay control in accordance with embodiments of the present disclosure is also referred to as a self-write technique.

For example, a read count value RCNT #2 of the second memory block BLK #2 may be a value less than the read count value RCNT #1 of the first memory block BLK #1.

For another example, the read count value RCNT #2 of the second memory block BLK #2 may occupy less than the predefined threshold percentage with respect to the total sum of the read count values of the plurality of respective memory blocks BLK #1, BLK #2, BLK #3 and BLK #4 in the first superblock.

For still another example, the read count value RCNT #2 of the second memory block BLK #2 may be a minimum value among read count values of the plurality of respective memory blocks BLK #1, BLK #2, BLK #3 and BLK #4 in the first superblock.

For yet another example, the read count value RCNT #2 of the second memory block BLK #2 may be smaller than the predefined threshold value.

The first memory block BLK #1 and the second memory block BLK #2 may be included in the same superblock SB.

The first memory block BLK #1 and the second memory block BLK #2 may be positioned in the same memory die, or may be positioned in different memory dies.

For the above-described partial close delay control, the memory controller 120 in accordance with embodiments of the present disclosure may include the memory interface 122 for communicating with the memory device 110 including the plurality of memory blocks BLK, and the control circuit 123 for controlling the write operation of the first data DATA #1 to be performed on one of the first memory block BLK #1 and the second memory block BLK #2 among the plurality of memory blocks BLK, depending on the read count value RCNT #1 of the first memory block BLK #1 being the current write-scheduled position among the plurality of memory blocks BLK.

In the case where the write operation of the first data DATA #1 is performed on the second memory block BLK #2 when the write position is changed depending on the read count value RCNT #1 of the first memory block BLK #1, the read count value RCNT #2 of the second memory block BLK #2 which is a changed write position may be less than the read count value RCNT #1 of the first memory block BLK #1 which is the write position before the change.

The above may be summarized as follows. In the write operation of the first data DATA #1, the memory controller 120 checks the read count value RCNT #1 of the first memory block BLK #1 which is the current write-scheduled position determined according to the predefined write position sequence among the plurality of memory blocks BLK of the memory device 110 (S610).

Thereafter, the memory controller 120 determines whether the checked read count value RCNT #1 of the first memory block BLK #1 satisfies the specific condition (S620). As a result of the determination, if the checked read count value RCNT #1 of the first memory block BLK #1 does not satisfy the specific condition, the memory controller 120 maintains the write position of the first data DATA #1 as the first memory block BLK #1 being the current write-scheduled position, and thereby controls the write operation of the first data DATA #1 to be performed on the first memory block BLK #1 which is the current write-scheduled position (S630).

As a result of the determination of step S620, if the checked read count value RCNT #1 of the first memory block BLK #1 satisfies the specific condition, the memory controller 120 changes the write position of the first data DATA #1 from the first memory block BLK #1 which is the current write-scheduled position to the second memory block BLK #2, and thereby controls the write operation of the first data DATA #1 to be performed on the second memory block BLK #2 which is a changed write position (S640 and S650).

The second memory block BLK #2 which is the changed write position of the first data DATA #1 may be included in the same superblock as the first memory block BLK #1 among the plurality of memory blocks BLK.

The specific condition mentioned above may be a condition for determining whether to apply the self-write technique. For example, if the checked read count value RCNT #1 of the first memory block BLK #1 which is the current write-scheduled position is less than the predefined threshold value, the memory controller 120 determines that the checked read count value RCNT #1 of the first memory block BLK #1 does not satisfy the specific condition. If the checked read count value RCNT #1 of the first memory block BLK #1 is equal to or greater than the predefined threshold value, the memory controller 120 may determine that the checked read count value RCNT #1 of the first memory block BLK #1 satisfies the specific condition.

For another example, if a percentage occupied by the checked read count value RCNT #1 of the first memory block BLK #1 in the total sum of the read count values of the plurality of respective memory blocks BLK included in the superblock, in which the first memory block BLK #1 is included, is less than the predefined threshold percentage, the memory controller 120 may determine that the checked read count value RCNT #1 of the first memory block BLK #1 does not satisfy the specific condition. If a percentage occupied by the checked read count value RCNT #1 of the first memory block BLK #1 in the total sum of the read count values of the plurality of respective memory blocks BLK included in the superblock, in which the first memory block BLK #1 is included, is equal to or greater than the predefined threshold percentage, the memory controller 120 may determine that the checked read count value RCNT #1 of the first memory block BLK #1 satisfies the specific condition.

When the first data DATA #1 is hot data, the memory controller 120 performs the process of checking the read count value RCNT #1 of the first memory block BLK #1 which is the current write-scheduled position, and thereby controls, depending on the checked read count value RCNT #1 of the first memory block BLK #1, the write operation of the first data DATA #1 to be performed on the first memory block BLK #1 or the second memory block BLK #2.

When the first data DATA #1 is cold data, the memory controller 120 does not perform the process of checking the read count value RCNT #1 of the first memory block BLK #1 which is the current write-scheduled position and the process of changing the write position, and controls the write operation of the first data DATA #1 to be performed on the first memory block BLK #1 which is the current write-scheduled position. Cold data which is data different from hot data may mean data which is expected to be read-requested by less than the threshold read request count or which has already been read-requested by less than the threshold read request count.

That is, in the case where the first data DATA #1 is cold data, the memory controller 120 may control the write operation of the first data DATA #1 to be performed as it is in the first memory block BLK #1 which is the current write-scheduled position.

A method for determining the first data DATA #1 as hot data may be described later with reference to FIG. 15.

Hereinbelow, the partial close delay control outlined above may be described in further detail.

Figure 7:
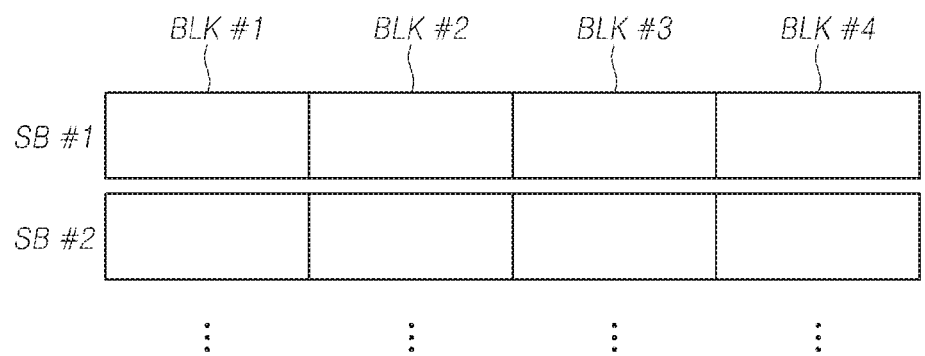
FIG. 7 is a schematic diagram illustrating a disposition of memory blocks in a partial close delay control method of a memory system in accordance with embodiments of the present disclosure.

FIG. 7 is a diagram illustrating the disposition of memory blocks in the partial close delay control method of the memory system 100 in accordance with embodiments of the present disclosure.

Referring to FIG. 7, the memory controller 120 may manage the plurality of memory blocks BLK disposed in the memory device 110 in the unit of a superblock SB.

The plurality of memory blocks BLK disposed in the memory device 110 may be grouped into at least two superblocks SB #1, SB #2, . . . . That is, the plurality of memory blocks BLK disposed in the memory device 110 may be divisionally allocated to the at least two superblocks SB #1, SB #2, . . . .

Each of the at least two superblocks SB #1, SB #2, . . . may be configured to include a plurality of memory blocks BLK #1, BLK #2, BLK #3 and BLK #4.

The numbers of the plurality of memory blocks BLK #1, BLK #2, BLK #3 and BLK #4 included in the at least two respective superblocks SB #1, SB #2, . . . may be the same or different.

The control circuit 123 of the memory controller 120 may manage the plurality of memory blocks BLK as the at least two superblocks SB #1, SB #2, . . . each including the plurality of memory blocks BLK #1, BLK #2, BLK #3 and BLK #4.

Each of the at least two superblocks SB #1, SB #2, . . . may be configured by at least one plane, and may correspond to at least one memory die.

Figure 8:
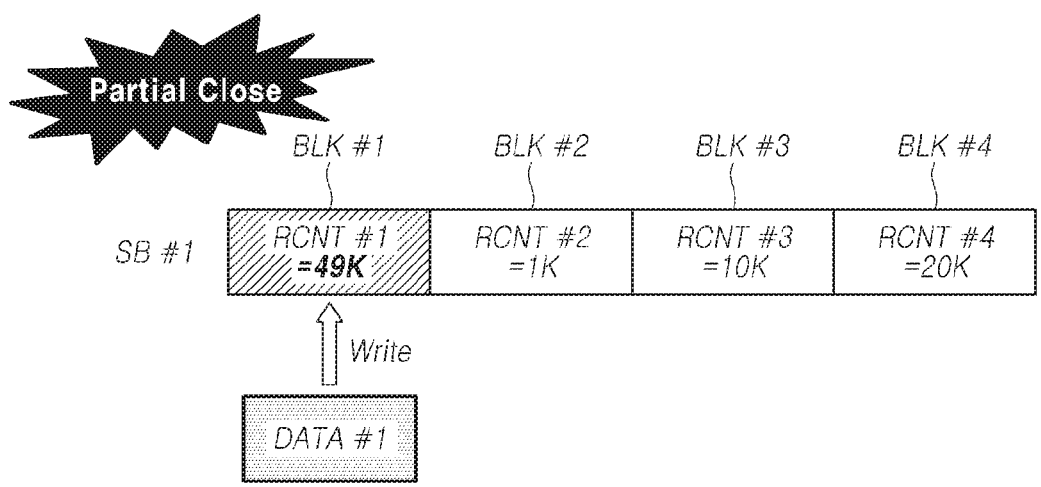
FIG. 8 is a schematic diagram illustrating a partial close phenomenon occurring in a memory system in accordance with embodiments of the present disclosure.

FIG. 8 is a diagram illustrating a partial close phenomenon occurring in the memory system 100 in accordance with embodiments of the present disclosure.

Referring to FIG. 8, a first superblock SB #1 is configured to include four memory blocks BLK #1, BLK #2, BLK #3 and BLK #4. The first superblock SB #1 is an open superblock.

Referring to FIG. 8, a read count value RCNT #1 of a first memory block BLK #1 among the four memory blocks BLK #1, BLK #2, BLK #3 and BLK #4 included in the first superblock SB #1 is greater than read count values RCNT #2, RCNT #3 and RCNT #4 of the other memory blocks BLK #2, BLK #3 and BLK #4.

Referring to FIG. 8, when a threshold value causing a partial close (or a read reclaim) is around 50K, if the read count value RCNT #1 of the first memory block BLK #1 increases only slightly, a partial close phenomenon may occur in which the first memory block BLK #1 may no longer be written to or the first superblock SB #1 may no longer be written to.

Referring to FIG. 8, in a state where the read count value RCNT #1 of the first memory block BLK #1 is considerably high, if first data DATA #1 which is likely to be frequently read is written to the first memory block BLK #1, the read count value RCNT #1 of the first memory block BLK #1 may easily reach the partial close threshold value (or the read reclaim threshold value), thus, the partial close of the first superblock SB #1 including the first memory block BLK #1 may be advanced quickly.

In relation to a partial close operation, when the read count value RCNT #1 of the first memory block BLK #1 among the plurality of memory blocks BLK #1, BLK #2, BLK #3 and BLK #4 included in each of the at least two superblocks SB #1, SB #2, . . . becomes equal to or greater than the preset partial close threshold value, the control circuit 123 of the memory controller 120 may prohibit a write operation in the first memory block BLK #1 or prohibit a write operation in the first superblock SB #1 in which the first memory block BLK #1 is included.

Figure 9:
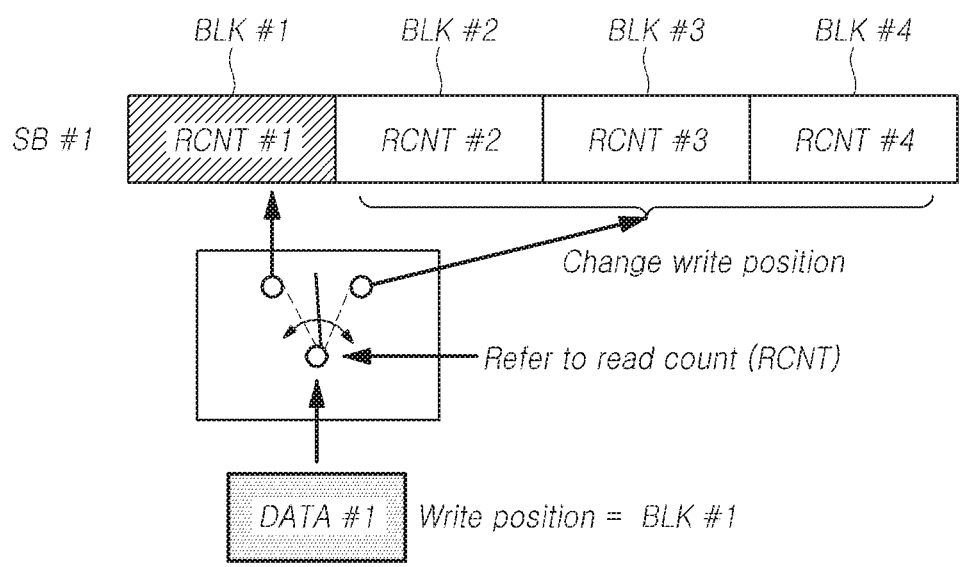
FIG. 9 is a schematic diagram of a partial close delay control of a memory system in accordance with embodiments of the present disclosure.
Figure 10:
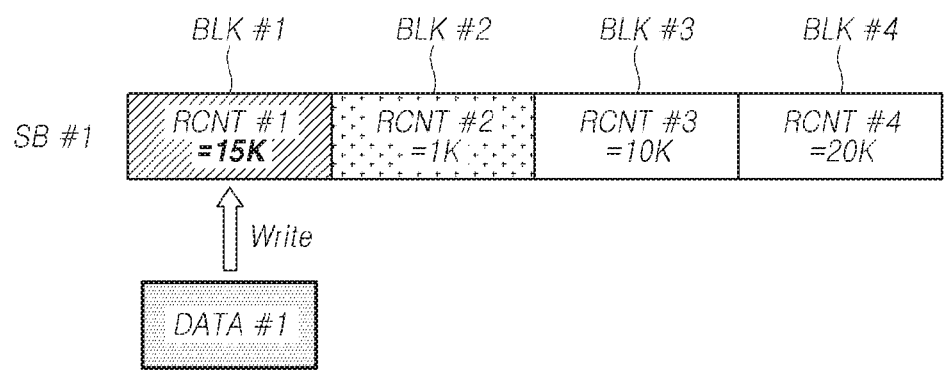
FIGS. 10 and 11 are schematic diagrams illustrating a partial close delay control method through write position control of a memory system in accordance with embodiments of the present disclosure.
Figure 11:
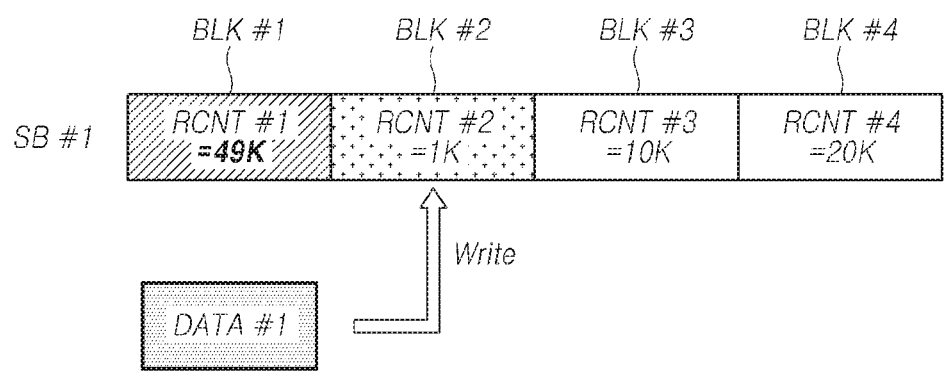

FIG. 9 is a diagram of the partial close delay control of the memory system 100 in accordance with embodiments of the present disclosure, and FIGS. 10 and 11 are diagrams exemplarily illustrating the partial close delay control method through write position control of the memory system 100 in accordance with embodiments of the present disclosure.

Referring to FIG. 9, a first superblock SB #1 may include a plurality of memory blocks BLK #1, BLK #2, BLK #3 and BLK #4, and a first memory block BLK #1 and a second memory block BLK #2 may exist among the plurality of memory blocks BLK #1, BLK #2, BLK #3 and BLK #4 included in the first superblock SB #1.

A write position control technique may be used for the partial close delay control. The write position control technique is also referred to as a self-write technique.

In order to describe the partial close delay control through the write position control technique, the first superblock SB #1 is taken as an example. For the purpose of description, data to be written is first data DATA #1 and a write position of the first data DATA #1 is the first memory block BLK #1. That is, the first data DATA #1 is written to the first memory block BLK #1 in the case where the partial close delay control through the write position control technique is not applied.

Referring to FIG. 9, for the partial close delay control through the write position control technique, the control circuit 123 of the memory controller 120 may select, by referring to read count values RCNT #1, RCNT #2, RCNT #3 and RCNT #4 of the plurality of respective memory blocks BLK #1, BLK #2, BLK #3 and BLK #4 included in the first superblock SB #1, a memory block in which the first data DATA #1 is to be written to, from the plurality of memory blocks BLK #1, BLK #2, BLK #3 and BLK #4 included in the first superblock SB #1.

The read count values RCNT #1, RCNT #2, RCNT #3 and RCNT #4 of the plurality of respective memory blocks BLK #1, BLK #2, BLK #3 and BLK #4 included in the first superblock SB #1 may be stored in the memory device 110, may be stored in the working memory 125 in the memory controller 120, or may be stored in the memory device 110, and then be loaded to the working memory 125 in the memory controller 120.

Referring to FIG. 9, if the read count value RCNT #1 of the first memory block BLK #1 corresponding to the write position of the first data DATA #1 to be currently written is not a value that may cause a partial close, the control circuit 123 of the memory controller 120 selects the first memory block BLK #1 corresponding to the write position of the first data DATA #1 to be currently written, as a final write position.

Referring to FIG. 9, if the read count value RCNT #1 of the first memory block BLK #1 corresponding to the write position of the first data DATA #1 to be currently written is a value that may cause a partial close, the control circuit 123 of the memory controller 120 selects one of the memory blocks BLK #2, BLK #3 and BLK #4, as a final write position of the first data DATA #1.

The memory block, which is selected as a final write position of the first data DATA #1 from among the memory blocks BLK #2, BLK #3 and BLK #4, may be a memory block which has a read count value less than the read count value RCNT #1 of the first memory block BLK #1.

Alternatively, even though the memory block which is selected as a final write position of the first data DATA #1 has a read count value equal to or greater than the read count value RCNT #1 of the first memory block BLK #1, the selected memory block may be a memory block whose read count value has no or little possibility to increase.

When, as described above, "the read count value RCNT #1 of the first memory block BLK #1 is a value that may cause a partial close," it may mean that the read count value RCNT #1 of the first memory block BLK #1 is equal to or greater than a partial close delay control threshold value.

Alternatively, when "the read count value RCNT #1 of the first memory block BLK #1 is a value that may cause a partial close," it may mean that the read count value RCNT #1 of the first memory block BLK #1 is a value close to a preset partial close threshold value within a predetermined range (e.g., 5%). The partial close threshold value may be a value equal to or greater than the partial close delay control threshold value.

Alternatively, when "the read count value RCNT #1 of the first memory block BLK #1 is a value that may cause a partial close," it may mean that the read count value RCNT #1 of the first memory block BLK #1 is at least a predetermined level higher than the read count values RCNT #2, RCNT #3 and RCNT #4 of the other memory blocks BLK #2, BLK #3 and BLK #4.

Alternatively, when "the read count value RCNT #1 of the first memory block BLK #1 is a value that may cause a partial close," it may mean that the read count value RCNT #1 of the first memory block BLK #1 is equal to or greater than at least a threshold percentage with respect to the total sum RCNT #1+RCNT #2+RCNT #3+RCNT #4 of the read count values RCNT #1, RCNT #2, RCNT #3 and RCNT #4 of the plurality of respective memory blocks BLK #1, BLK #2, BLK #3 and BLK #4 included in the first superblock SB #1.

For example, referring to FIGS. 9 and 10, in the case where the read count value RCNT #1 of the first memory block BLK #1 is less than the threshold percentage with respect to the total sum RCNT #1+RCNT #2+RCNT #3+RCNT #4 of the read count values RCNT #1, RCNT #2, RCNT #3 and RCNT #4 of the plurality of respective memory blocks BLK #1, BLK #2, BLK #3 and BLK #4 included in the first superblock SB #1, the control circuit 123 of the memory controller 120 may select the first memory block BLK #1 as a final write position of the first data DATA #1, and thereby, may control the write operation of the first data DATA #1 to be performed on the first memory block BLK #1.

Referring to FIGS. 9 and 11, in the case where the read count value RCNT #1 of the first memory block BLK #1 is equal to or greater than at least the threshold percentage with respect to the total sum RCNT #1+RCNT #2+RCNT #3+RCNT #4 of the read count values RCNT #1, RCNT #2, RCNT #3 and RCNT #4 of the plurality of respective memory blocks BLK #1, BLK #2, BLK #3 and BLK #4 included in the first superblock SB #1, the control circuit 123 of the memory controller 120 may select the second memory block BLK #2 as a final write position even though the first memory block BLK #1 is the write position of the first data DATA #1, and thereby, may control the write operation of the first data DATA #1 to be performed on the second memory block BLK #2.

For another example, referring to FIGS. 9 and 10, in the case where the read count value RCNT #1 of the first memory block BLK #1 is less than the partial close delay control threshold value, the control circuit 123 of the memory controller 120 may select the first memory block BLK #1 as a final write position of the first data DATA #1, and thereby, may control the write operation of the first data DATA #1 to be performed on the first memory block BLK #1.

Referring to FIGS. 9 and 11, in the case where the read count value RCNT #1 of the first memory block BLK #1 is equal to or greater than the partial close delay control threshold value, the control circuit 123 of the memory controller 120 may select the second memory block BLK #2 as a final write position even though the first memory block BLK #1 is the write position of the first data DATA #1, and thereby, may control the write operation of the first data DATA #1 to be performed on the second memory block BLK #2.

For example, in the case where the write operation of the first data DATA #1 is performed on the second memory block BLK #2 as a changed write position depending on the read count value RCNT #1 of the first memory block BLK #1, the read count value RCNT #2 of the second memory block BLK #2 may be less than the read count value RCNT #1 of the first memory block BLK #1.

In this case, the second memory block BLK #2 may be a memory block which has the lowest read count value RCNT #2 among the read count values RCNT #1, RCNT #2, RCNT #3 and RCNT #4 of the plurality of respective memory blocks BLK #1, BLK #2, BLK #3 and BLK #4 included in the first superblock SB #1.

For another example, even in the case where the read count value RCNT #2 of the second memory block BLK #2 is not less than the read count value RCNT #1 of the first memory block BLK #1 or is not the lowest read count value RCNT #2 among the read count values RCNT #1, RCNT #2, RCNT #3 and RCNT #4 of the plurality of respective memory blocks BLK #1, BLK #2, BLK #3 and BLK #4 included in the first superblock SB #1, the second memory block BLK #2 may be a memory block whose increase prediction value in terms of read count value is lowest.

The increase prediction value in terms of read count value may be a value calculated based on data read pattern information (data read history information) stored in the plurality of respective memory blocks BLK #1, BLK #2, BLK #3 and BLK #4 included in the first superblock SB #1.

Figure 12:
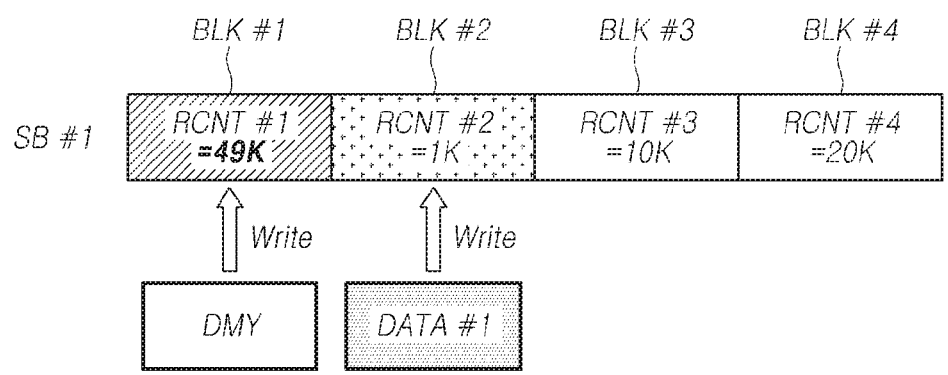
FIGS. 12 and 13 are schematic diagrams illustrating modifications of a partial close delay control method through write position control of the memory system in accordance with embodiments of the present disclosure.
Figure 13:
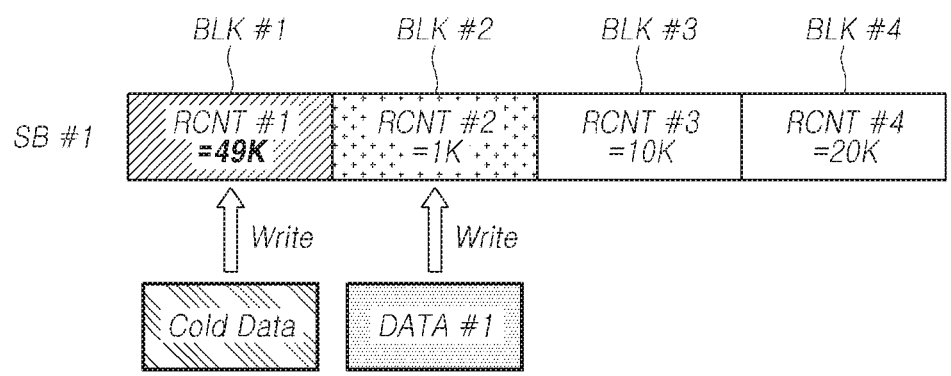

FIGS. 12 and 13 are diagrams illustrating modifications of the partial close delay control method through write position control of the memory system 100 in accordance with embodiments of the present disclosure.

In the case where the write operation of the first data DATA #1 is performed on the second memory block BLK #2 which is a changed write position, a write sequence known in advance may be changed. Due to this fact, in order to match the write sequence known in advance, the control circuit 123 of the memory controller 120 may control data different from the first data DATA #1 to be written to the first memory block BLK #1 which was the original write position.

Namely, if the first data DATA #1 is determined as hot data and the checked read count value RCNT #1 of the first memory block BLK #1 which is the current write-scheduled position satisfies the specific condition described above, the memory controller 120 changes the write position of the first data DATA #1 from the first memory block BLK #1 which is the current write-scheduled position to the second memory block BLK #2. Accordingly, the memory controller 120 may control a write operation of the data different from the first data DATA #1 to be performed on the first memory block BLK #1 which is the current write-scheduled position. Then, when the second memory block BLK #2 which is the changed write position of the first data DATA #1 becomes a current write-scheduled position according to the predefined write position sequence, the memory controller 120 may control the write operation of the first data DATA #1 to be performed on the second memory block BLK #2.

The above-described data different from the first data DATA #1 may mean data which may cause a lower read request count.

For example, as illustrated in FIG. 12, the control circuit 123 of the memory controller 120 may control a write operation of dummy data DMY as data different from the first data DATA #1 which may cause no read request, to be performed on the first memory block BLK #1 which is the write position before the change. Thereafter, the control circuit 123 of the memory controller 120 may control the write operation of the first data DATA #1 to be performed on the second memory block BLK #2 which is the changed write position.

The dummy data DMY may be data for which a read operation is not performed. That is, the dummy data DMY may be data for which a read operation command is not generated from the host. Due to this fact, the possibility for the read count value RCNT #1 of the first memory block BLK #1 to be increased by the dummy data DMY may be none or substantially low.

For another example, as illustrated in FIG. 13, in the case where the write operation of the first data DATA #1 is performed on the second memory block BLK #2 which is the changed write position, the memory controller 120 may control a write operation of cold data which may cause a read request count less than the threshold read request count, to be performed on the first memory block BLK #1 which is the write position before the change. Thereafter, the control circuit 123 of the memory controller 120 may control the write operation of the first data DATA #1 to be performed on the second memory block BLK #2 which is the changed write position.

The cold data which is data that has a read frequency equal to or lower than a predetermined level, may have the read frequency lower than that of the first data DATA #1. Due to this fact, the possibility for the read count value RCNT #1 of the first memory block BLK #1 to be increased by the cold data may be low.

Figure 14:
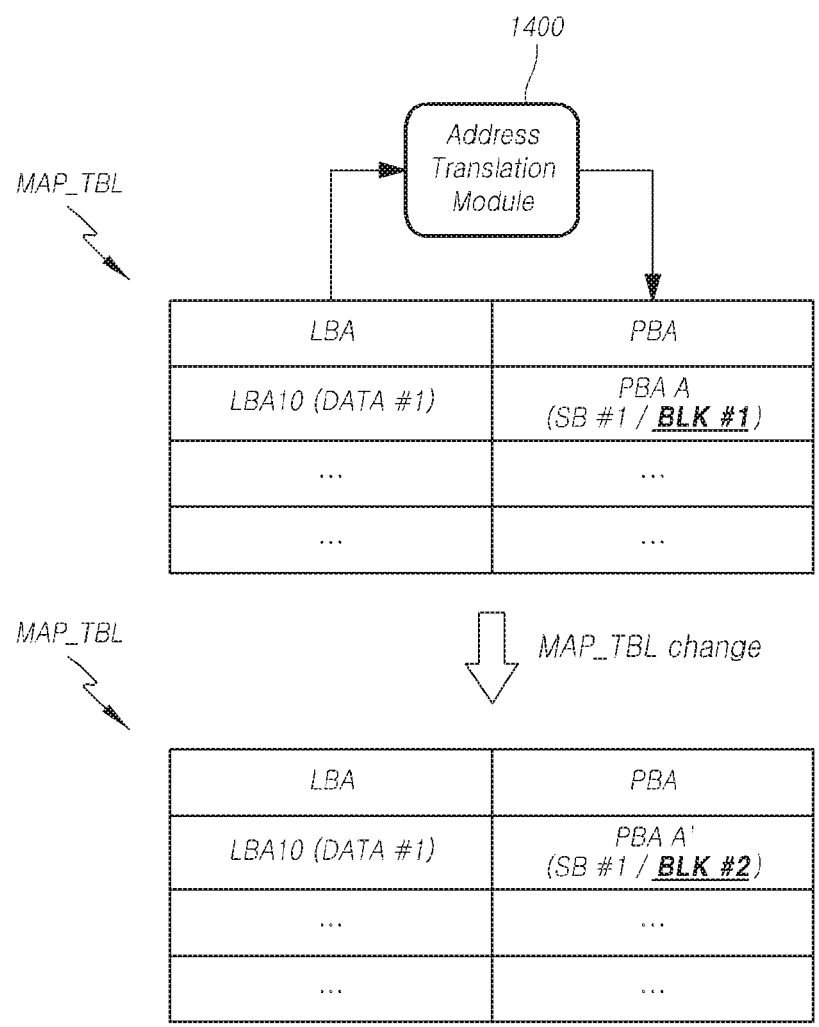
FIG. 14 is a schematic diagram illustrating an example of an address translation module and the operation thereof for write position control of the memory system in accordance with embodiments of the present disclosure.

FIG. 14 is a diagram illustrating an address translation module 1400 and the operation thereof for the write position control of the memory system 100 in accordance with embodiments of the present disclosure.

Referring to FIG. 14, for the write position control, the memory controller 120 in accordance with embodiments of the present disclosure may manage a mapping table MAP_TBL between logical addresses LBA and physical addresses PBA, and may further include the address translation module 1400 which changes the mapping relationship between logical addresses LBA and physical addresses PBA within the mapping table MAP_TBL.

The address translation module 1400 may change, in the mapping table MAP_TBL, a physical address PBA mapped to a first logical address LBA10 corresponding to the first data DATA #1 from a first physical address PBA A for the first memory block BLK #1 to a second physical address PBA A' for the second memory block BLK #2, and thereby, may change the write position of the first data DATA #1 from the first memory block BLK #1 to the second memory block BLK #2.

The first physical address PBA A for the first memory block BLK #1, which is mapped to the first logical address LBA10 corresponding to the first data DATA #1, may be a physical address of the first memory block BLK #1 in the first superblock SB #1, may include physical address information of the first memory block BLK #1, and may further include identification information (or address information) of the first superblock SB #1 including the first memory block BLK #1. In other words, the first physical address PBA A which is mapped to the first logical address LBA10 corresponding to the first data DATA #1 may be combined information of the identification information of the first superblock SB #1 and the physical address of the first memory block BLK #1.

The second physical address PBA A' for the second memory block BLK #2, which is mapped to the first logical address LBA10 corresponding to the first data DATA #1, may be a physical address of the second memory block BLK #2 in the first superblock SB #1, may include physical address information of the second memory block BLK #2, and may further include identification information (or address information) of the first superblock SB #1 including the second memory block BLK #2. In other words, the second physical address PBA A' which is mapped to the first logical address LBA10 corresponding to the first data DATA #1 may be combined information of the identification information of the first superblock SB #1 and the physical address of the second memory block BLK #2.

Namely, if the checked read count value RCNT #1 of the first memory block BLK #1 does not satisfy the specific condition (a self-write condition), the address translation module 1400 of the memory controller 120 may maintain a physical address mapped to the first logical address LBA10 of the first data DATA #1 as a physical address of the first memory block BLK #1 in the mapping table MAP_TBL.

If the checked read count value RCNT #1 of the first memory block BLK #1 satisfies the specific condition (the self-write condition), the address translation module 1400 of the memory controller 120 may change a physical address mapped to the first logical address LBA10 of the first data DATA #1 to a physical address of the second memory block BLK #2 in the mapping table MAP_TBL.

The address translation module 1400 described above may be a flash translation layer (FTL) module.

The above-mentioned mapping table MAP_TBL may be stored in the memory device 110, may be stored in the working memory 125 in the memory controller 120, or may be stored in the memory device 110 and then be loaded to the working memory 125 in the memory controller 120.

Figure 15:
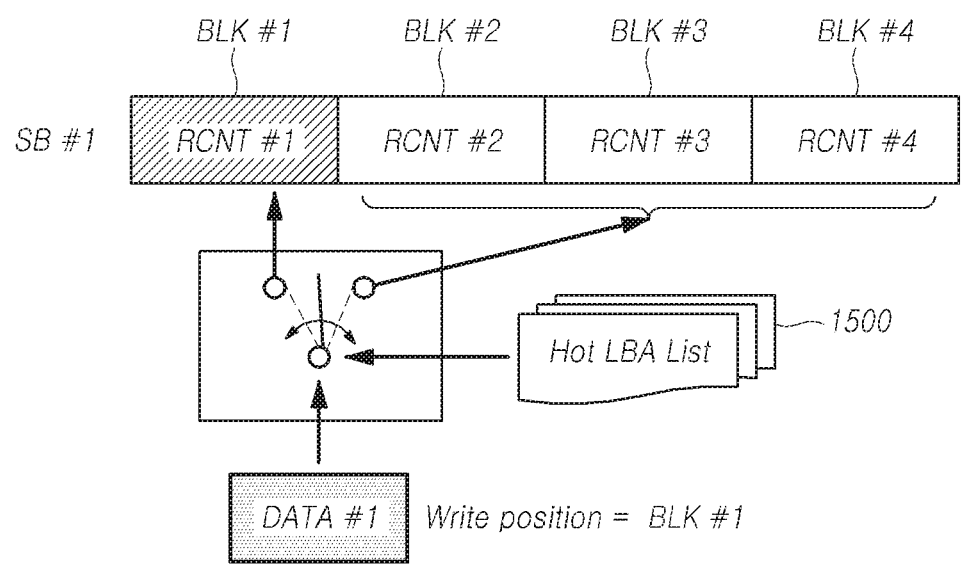
FIG. 15 is a schematic diagram of a write position control utilizing a hot logical address list of the memory system in accordance with embodiments of the present disclosure.

FIG. 15 is a diagram of the write position control by utilizing a hot logical address list 1500 of the memory system 100 in accordance with embodiments of the present disclosure.

Referring to FIG. 15, the control circuit 123 of the memory controller 120 may manage the hot logical address list (Hot LBA List) 1500 which records logical addresses LBA for data whose access percentages are equal to or greater than a threshold access percentage.

The hot logical address list 1500 may include logical addresses LBA for data whose access percentages (read percentages) or read request counts (e.g., read count values) are equal to or greater than a preset threshold access percentage or a threshold read request count (e.g., a threshold read count value). The access percentage (read percentage) of each piece of data indicates how many read operations are caused for the piece. For example, the access percentage may be expressed as a read request count of a corresponding piece of data with respect to a read request count for all of the pieces of data by the host.

If a write request of the first data DATA #1 is generated, the memory controller 120 may check the hot logical address list 1500 in which logical addresses for hot data are included. If it is checked that a first logical address for the first data DATA #1 is included in the hot logical address list 1500, the memory controller 120 may determine the first data DATA #1 as hot data. If it is checked that a first logical address for the first data DATA #1 is not included in the hot logical address list 1500, the memory controller 120 may determine the first data DATA #1 as cold data.

The memory controller 120 may generate and correct the hot logical address list 1500 based on information (e.g., identification information for hot data or logical address information for hot data) received from the host. This may be a list generation and management method useful for a case where the write operation of the first data DATA #1 is an operation of initially writing the first data DATA #1 to the memory device 110.

Alternatively, the memory controller 120 may generate and correct the hot logical address list 1500 which includes logical address information for data whose read count values are equal to or greater than the threshold read count value, based on read count values for respective data. This may be a list generation and management method useful for a case where the write operation of the first data DATA #1 is a migration operation (a type of write operation) attempting to migrate the first data DATA #1 which is already written to a certain memory block in the memory device 110 to another memory block (e.g., BLK #1).

The memory controller 120 may correct the hot logical address list 1500 depending on information received from the host (e.g., identification information for added hot data or logical address information for added hot data), a status change of a write buffer, a change in a read count value of each data, or information on an event that occurs in a read operation of the memory device 110 (e.g., identification information for added hot data or logical address information for added hot data depending on error check result information or soft decoding result information).

In the case where a logical address LBA for the first data DATA #1 is not included in the hot logical address list 1500, the memory controller 120 may determine the first data DATA #1 as cold data, and thereby, may control the write operation of the first data DATA #1 to be performed on the first memory block BLK #1 which is the current write-scheduled position. The position (address) of the first memory block BLK #1 may correspond to a physical address PBA corresponding to a logical address LBA for the first data DATA #1.

In the case where a logical address LBA for the first data DATA #1 is included in the hot logical address list 1500, the memory controller 120 may determine the first data DATA #1 as hot data, and thereby, may control the write operation of the first data DATA #1 to be performed on the second memory block BLK #2.

The hot logical address list 1500 may be stored in the memory device 110, may be stored in the working memory 125 in the memory controller 120, or may be stored in the memory device 110 and be then loaded to the working memory 125 in the memory controller 120.

By the partial close delay control according to the embodiments of the present disclosure described above, it is possible to prevent a read count value of a specific memory block BLK from excessively increasing in comparison with other memory blocks BLK, whereby it is possible to delay the occurrence of a read reclaim and a partial close phenomenon.

That is, by the partial close delay control according to the embodiments of the present disclosure described above, it is possible to delay a time point at which a partial close phenomenon of an open superblock SB occurs due to intensive reading of a specific memory block BLK in the superblock SB.

By the partial close delay control according to the embodiments of the present disclosure described above, it is possible to delay not only a time point at which a partial close occurs but also a time point at which a read reclaim is caused, and to increase the possibility for an open superblock to become a normal closed superblock which is entirely written.

The partial close delay control described above in terms of memory blocks BLK, and may be described below in terms of memory dies. The partial close delay control in terms of memory dies is basically the same as the partial close delay control in terms of memory blocks BLK.

Figure 16:
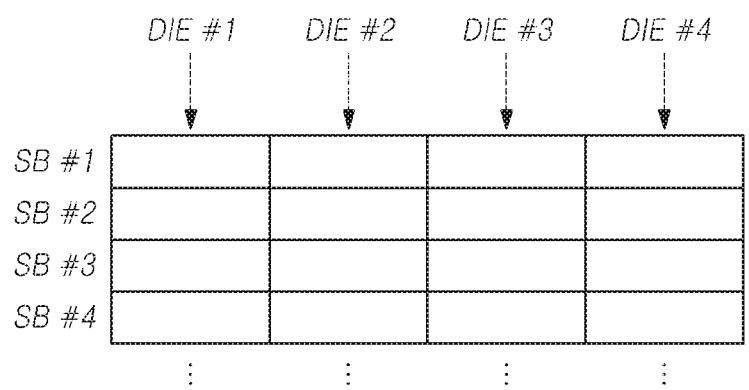
FIG. 16 is a diagram schematically illustrating a superblock structure of a memory device in accordance with embodiments of the present disclosure.

FIG. 16 is a diagram schematically illustrating a superblock structure of the memory device 110 in accordance with embodiments of the present disclosure.

FIG. 16 illustrates a simple superblock structure unlike the superblock structure illustrated in FIG. 5. The illustration of FIG. 16 corresponds to a case where each of a plurality of memory dies DIE #1, DIE #2, DIE #3 and DIE #4 includes one plane.

Referring to FIG. 16, as described above, the memory device 110 may be configured by the plurality of memory dies DIE #1, DIE #2, DIE #3 and DIE #4.

The plurality of memory blocks BLK included in the memory device 110 may be managed by being allocated to a plurality of superblocks SB #1, SB #2, SB #3 and SB #4.

Each of the plurality of superblocks SB #1, SB #2, SB #3 and SB #4 may include a plurality of memory blocks BLK.

In FIG. 16, one box may be regarded as a memory block BLK. In this case, each of the plurality of superblocks SB #1, SB #2, SB #3 and SB #4 illustrated in FIG. 16 includes four memory blocks BLK. The four memory blocks BLK included in each of the plurality of superblocks SB #1, SB #2, SB #3 and SB #4 may be positioned in the four memory dies DIE #1, DIE #2, DIE #3 and DIE #4, respectively.

Figure 17:
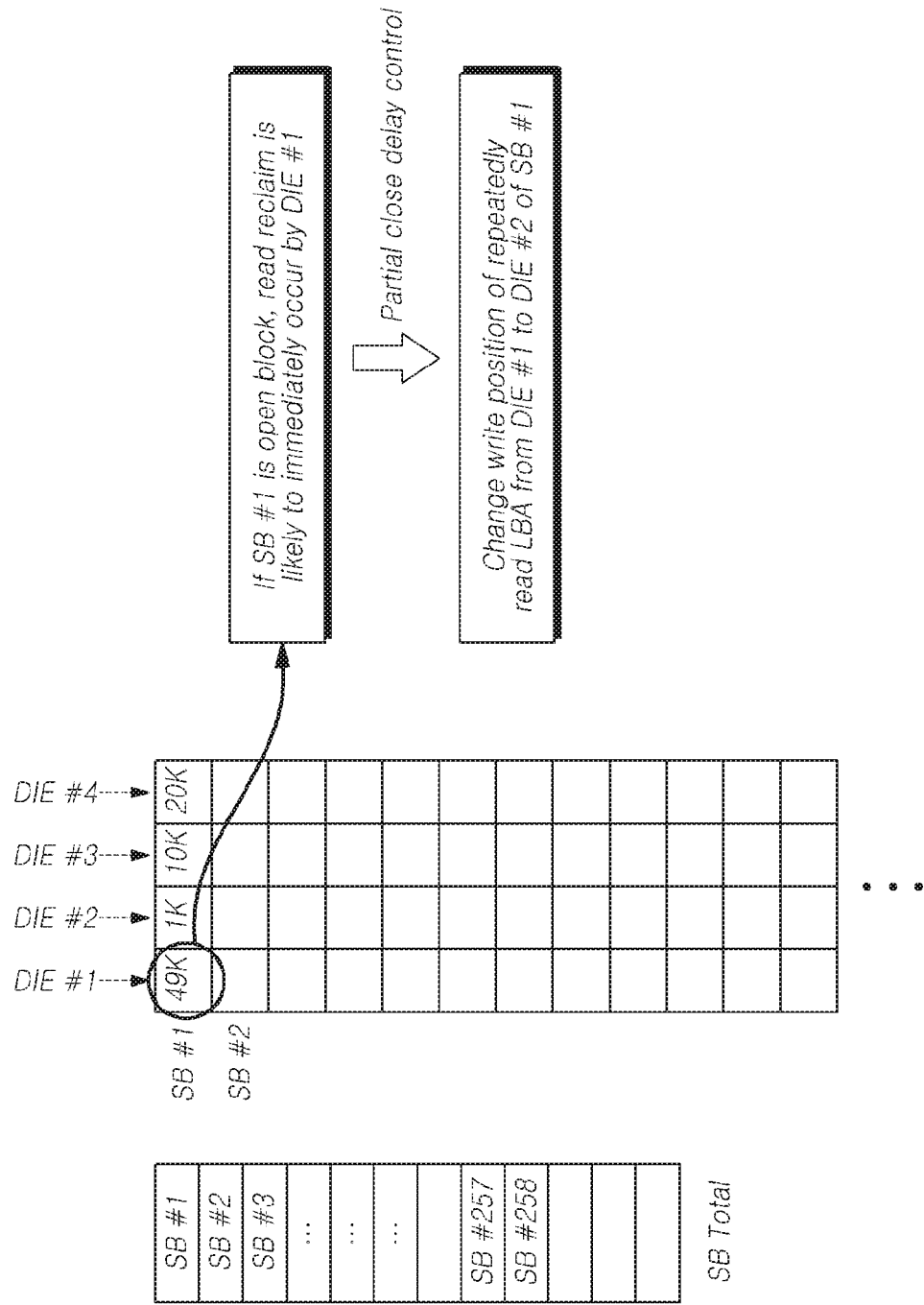
FIG. 17 is a schematic diagram of a partial close delay control method through write position control of a memory system in accordance with embodiments of the present disclosure, in the superblock structure of FIG. 16.

FIG. 17 is a diagram of the partial close delay control method through the write position control of the memory system 100 in accordance with embodiments of the present disclosure, in the superblock structure of FIG. 16. In the following, the partial close delay control may be described in terms of a first superblock SB #1 among a plurality of superblocks SB #1, SB #2, . . . , SB #257, SB #258, . . . .

Referring to FIG. 17, the memory controller 120 may perform the partial close delay control by using a read count table RCNT TBL including read count values of the memory blocks BLK included in each of the plurality of superblocks SB #1, SB #2, . . . , SB #257, SB #258, . . . .

For example, in the read count table RCNT TBL, read count values of the four memory blocks included in the first superblock SB #1 are 49K, 1K, 10K and 20K, respectively. In other words, the read count value 49K of the memory block positioned in the first memory die DIE #1 among the four memory blocks included in the first superblock SB #1 is considerably higher than the read count values 1K, 10K and 20K of the memory blocks positioned in the second to fourth memory dies DIE #2, DIE #3 and DIE #4.

Namely, when the four memory blocks included in the first superblock SB #1 correspond to the four memory dies DIE DIE #2, DIE #3 and DIE #4, the above-described situation corresponds to a situation in which the read count value 49K of the specific one memory die DIE #1 is considerably higher than the read count values 1K, 10K and 20K of the second to fourth memory dies DIE #2, DIE #3 and DIE #4 among the read count values 49K, 1K, 10K and 20K for the four respective memory dies DIE #1, DIE #2, DIE #3 and DIE #4 of the first superblock SB #1.

In this way, when read operations are intensively performed on the first memory die DIE #1, if the first superblock SB #1 is an open superblock, a read reclaim and a partial close are highly likely to occur due to the first memory die DIE #1.

Thus, the memory controller 120 in accordance with embodiments of the present disclosure may control data which is highly likely to be repeatedly read, not to be written to the first memory die DIE #1 which is intensively read but to be written to the second memory die DIE #2 which is read relatively less.

The memory controller 120 in accordance with embodiments of the present disclosure may not write a physical address PBA corresponding to a logical address LBA for data which is highly likely to be repeatedly read, in the first memory die DIE #1 which is intensively read, and may migrate the physical address PBA to the second memory die DIE #2 which is read relatively less.

Data which is highly likely to be repeatedly read may be separately managed. In addition, a memory die, memory blocks or address information which are intensively read may be separately managed.

FIG. 18 is a diagram illustrating a case where the partial close delay control method through the write position control of the memory system 100 in accordance with embodiments of the present disclosure is not applied in the superblock structure of FIG. 16. FIGS. 19 to 21 are diagrams illustrating cases where the partial close delay control method through the write position control of the memory system 100 in accordance with embodiments of the present disclosure is applied in the superblock structure of FIG. 16.

The illustration of FIG. 18 corresponds to a situation where read count values of the four memory blocks included in the first superblock SB #1 are 49K, 1K, 10K and 20K, respectively. In other words, the illustration of FIG. 18 corresponds to a situation where the read count value 49K of the memory block positioned in the first memory die DIE #1 among the four memory blocks included in the first superblock SB #1 is considerably higher than the read count values 1K, 10K and 20K of the memory blocks positioned in the second to fourth memory dies DIE #2, DIE #3 and DIE #4.

Namely, when the four memory blocks included in the first superblock SB #1 correspond to the four memory dies DIE #1, DIE #2, DIE #3 and DIE #4, the above-described situation corresponds to a situation in which the read count value 49K of the specific one memory die DIE #1 is considerably higher than the read count values 1K, 10K and 20K of the second to fourth memory dies DIE #2, DIE #3 and DIE #4 among the read count values 49K, 1K, 10K and 20K for the four respective memory dies DIE #1, DIE #2, DIE #3 and DIE #4 of the first superblock SB #1.

Data stored in the memory block BLK included in the first memory die DIE #1 are data whose read count value is increased to 49K. That is, the data stored in the memory block BLK included in the first memory die DIE #1 are data which are read a lot. Logical addresses of the data stored in the memory block BLK included in the first memory die DIE #1 correspond to LBA1000, LBA1004 and LBA0.

As described above, when it is a situation in which read operations are intensively performed on the first memory die DIE #1, in the case where the first superblock SB #1 is an open superblock, if, as in FIG. 18, data corresponding to a logical address LBA10 is written to the first memory die DIE #1 whose read count value is relatively high, a read reclaim and a partial close may be highly likely to occur.

In this regard, by performing the partial close delay control through utilizing the above-described self-write technique, when it is a situation in which read operations are intensively performed on the first memory die DIE #1, in the case where the first superblock SB #1 is an open superblock, if, as in FIG. 19, data corresponding to a logical address LBA10 is written to the second memory die DIE #2 whose read count value is relatively low, a read reclaim and a partial close may be less likely to occur.

That is, in the case where read count values of the four memory dies DIE #1, DIE #2, DIE #3 and DIE #4 of the first superblock SB #1 are concentrated in the first memory die DIE #1 as any one memory die, the memory system 100 in accordance with embodiments of the present disclosure may distribute the read count values of the four memory dies DIE #1, DIE #2, DIE #3 and DIE #4 of the first superblock SB #1 through the self-write technique, thereby significantly delaying a time point at which a partial close occurs or preventing a partial close.

As illustrated in FIG. 20, depending on a position of a memory die to be written, a dummy write may be performed. In the case where logical addresses which are frequently read or which may be managed as included in the hot logical address list 1500 exist in the first memory die DIE #1 and a position where corresponding data (data corresponding to LBA10) is to be written in the first superblock SB #1 is the first memory die DIE the memory system 100 in accordance with embodiments of the present disclosure may perform a write operation of dummy data DMY to the first memory die DIE #1 whose read count value is already considerably high, and then, may write (self-write) the data corresponding to the logical address LBA10 to the second memory die DIE #2 whose read count value is minimal.

For example, the dummy data DMY may be data which may not be read in the future. Due to this fact, in the case of the first memory die DIE #1 whose read count value is already considerably high, there is little possibility that the read count value is increased by the dummy data DMY.

As illustrated in FIG. 21, depending on a position of a memory die to be written, a write of cold data Cold Data may be performed. In the case where logical addresses which are frequently read or which may be managed as included in the hot logical address list 1500 exist in the first memory die DIE #1 and a position where corresponding data (data corresponding to LBA10) is to be written in the first superblock SB #1 at the first memory die DIE #1, the memory system 100 in accordance with embodiments of the present disclosure may perform a write operation of the cold data Cold Data to the first memory die DIE #1 whose read count value is already considerably high, and then, may write (self-write) the data corresponding to the logical address LBA10 to the second memory die DIE #2 whose read count value is minimal.

For example, the cold data Cold Data may be data which may be read at a low frequency in the future. Due to this fact, in the case of the first memory die DIE #1 whose read count value is already considerably high, there is low possibility that the read count value may be increased by the cold data Cold Data.

In the following, the above-described partial close delay control method in accordance with embodiments of the present disclosure may be briefly described again.

Figure 22:
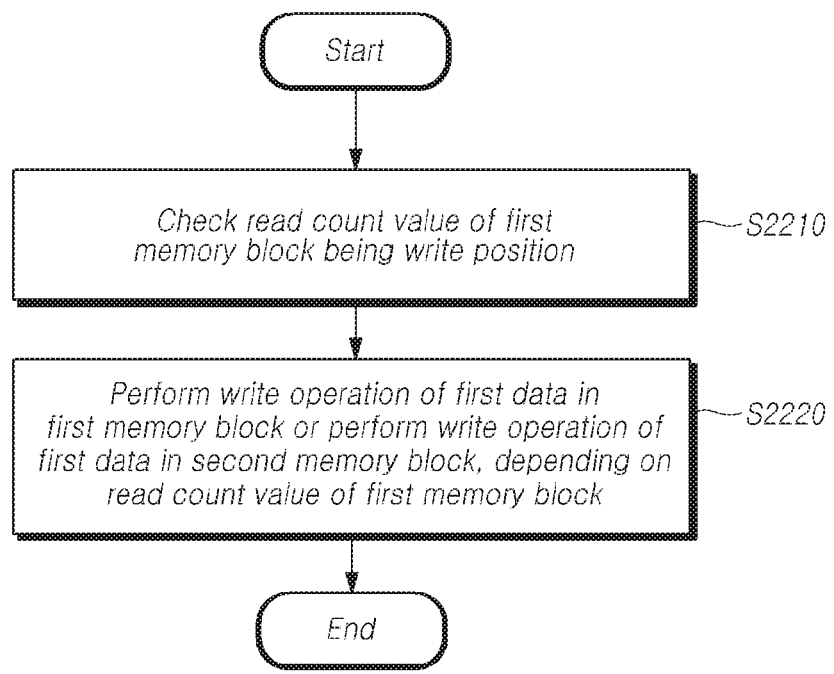
FIG. 22 is a flow chart of a method for operating a memory controller in accordance with embodiments of the present disclosure.

FIG. 22 is a flow chart of a method for operating the memory controller 120 in accordance with embodiments of the present disclosure.

Referring to FIG. 22, the method for operating the memory controller 120 in accordance with embodiments of the present disclosure may include checking the read count value RCNT #1 of the first memory block BLK #1 which is the current write-scheduled position according to the predefined write position sequence among the plurality of memory blocks BLK in the memory device 110 in the write operation of the first data DATA #1 (S2210), and controlling, depending on the checked read count value RCNT #1 of the first memory block BLK #1, the write operation of the first data DATA #1 to be performed on the first memory block BLK #1 which is the current write-scheduled position or the write operation of the first data DATA #1 to be performed on the second memory block BLK #2 among the plurality of memory blocks BLK (S2220). The second memory block BLK #2 which is the changed write position of the first data DATA #1 may be included in the same superblock as the first memory block BLK #1 among the plurality of memory blocks BLK.

At the step S2220, in the case where the write operation of the first data DATA #1 is performed on the second memory block BLK #2 which is the changed write position depending on the read count value RCNT #1 of the first memory block BLK #1, for example, the read count value RCNT #2 of the second memory block BLK #2 may be less than the read count value RCNT #1 of the first memory block BLK #1.

At the step S2220, in the case where the checked read count value RCNT #1 of the first memory block BLK #1 is included in a first range, the memory controller 120 may maintain the write position of the first data DATA #1 as the first memory block BLK #1 which is the current write-scheduled position. Alternatively, in the case where the checked read count value RCNT #1 of the first memory block BLK #1 is included in a second range having a lower limit value higher than an upper limit value of the first range, the memory controller 120 may change the write position of the first data DATA #1 to the second memory block BLK #2 which is included in the same superblock as the first memory block BLK #1 among the plurality of memory blocks BLK.

The first range mentioned above means a read count value range relatively lower than the second range. Namely, when the first read count value range is a range between a first lower limit value and a first upper limit value, and the second read count value range is a range between a second lower limit value and a second upper limit value, the second lower limit value of the second range may have a value higher (greater) than the first upper limit value of the first range.

Figure 23:
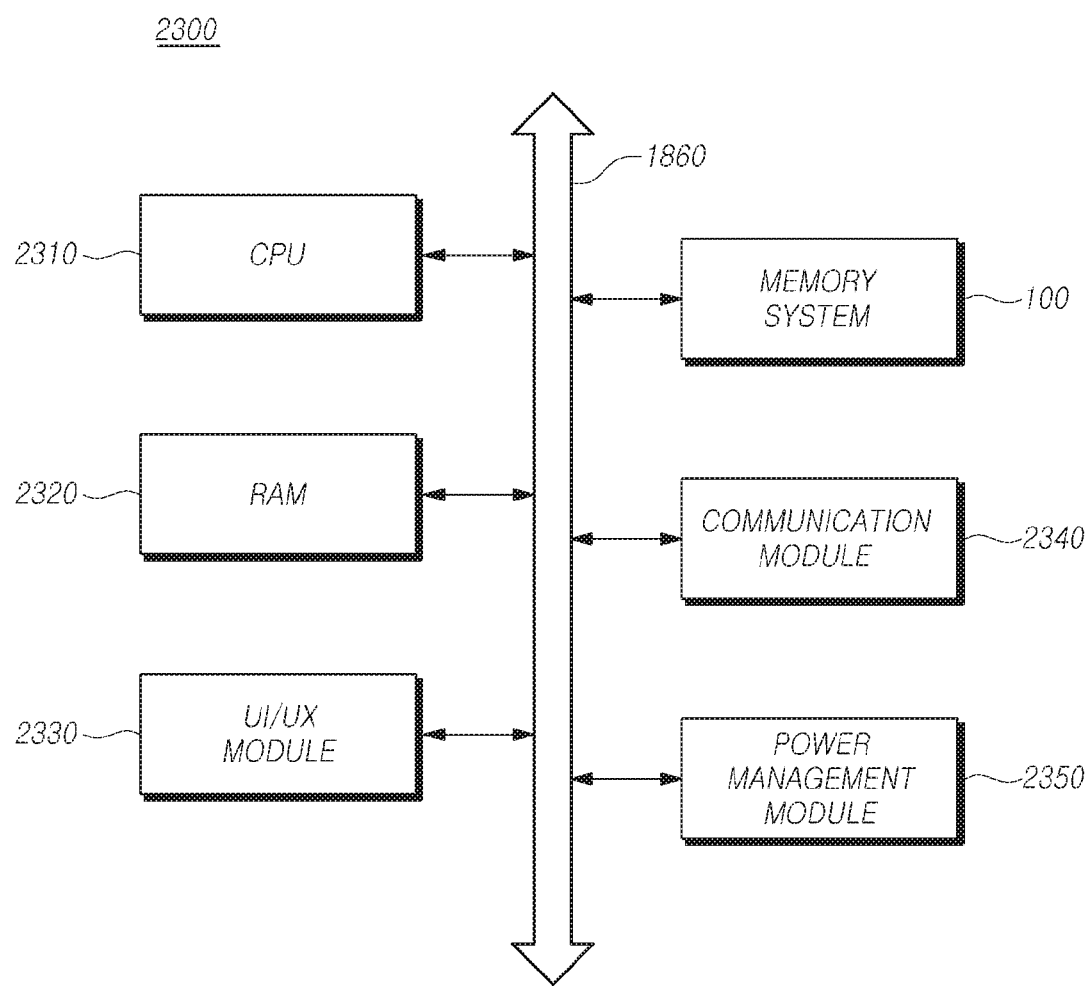
FIG. 23 is a configuration diagram illustrating a computing system in accordance with embodiments of the present disclosure.

FIG. 23 is a configuration diagram illustrating a computing system 2300 in accordance with embodiments of the present disclosure.

Referring to FIG. 23, the computing system 2300 in accordance with embodiments of the present disclosure may include a memory system 100, a central processing unit (CPU) 2310 for controlling general operations of the computing system 2300, a RAM 2320 for storing data and information related with operations of the computing system 2300, a UI/UX (user interface/user experience) module 2330 for providing an environment to a user, a communication module 2340 for communicating with an external device in a wired and/or wireless manner and a power management module 2350 for managing power used by the computing system 2300, all of which are electrically coupled to a system bus 1860.

The computing system 2300 may include a PC (personal computer), a mobile terminal such as a smartphone and a tablet or various electronic devices.

The computing system 2300 may further include a battery for supplying an operating voltage, and may further include an application chipset, a graphic-related module, a camera image processor (CIS), a DRAM and so forth. Furthermore, those skilled in the art may recognize that the computing system 2300 may include other components.

The memory system 100 may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM). In addition, the memory system 100 may be realized as various types of storage devices, and may be mounted in various electronic devices.

By the partial close delay control according to the embodiments of the present disclosure described above, it is possible to prevent a read count value of a certain storage space (e.g., a specific memory block BLK #1 or a specific memory die DIE #1) from excessively increasing in comparison with other storage spaces (e.g., other memory blocks BLK #2 to BLK #4 or other memory dies DIE #2 to DIE #4), thereby delaying or preventing the occurrence of a read reclaim and a partial close phenomenon.

That is, by the partial close delay control according to the embodiments of the present disclosure described above, it is possible to delay or prevent the occurrence of a partial close phenomenon of an open superblock SB, due to intensive reading of a specific storage space (e.g., a specific memory block BLK #1 or a specific memory die DIE #1) in the superblock SB.

By such partial close delay control according to the embodiments of the present disclosure, not only a time point at which a partial close occurs but also a time point at which a read reclaim is caused may be delayed, and the possibility of a memory block to become a normal closed superblock which is entirely written may be increased.

The partial close delay control according to the embodiments of the present disclosure may be applied when performing a data write operation to the memory device 110, and may be widely applied when performing a garbage collection (GC) operation, a bad block management (BBM) operation or the like, or when an operation (a data migration operation) similar to the data write operation is performed.

As is apparent from the above descriptions, according to the embodiments of the present disclosure, it is possible to efficiently utilize a storage space (e.g., a memory block or a memory die) in the memory device 110.

Also, according to the embodiments of the present disclosure, it is possible to increase the usage rate of the memory blocks BLK in the memory device 110.

Further, according to the embodiments of the present disclosure, it is possible to adaptively control a data write position depending on a read situation of storage spaces (e.g., memory blocks or memory dies) in the memory device 110.

Moreover, according to the embodiments of the present disclosure, it is possible to prevent the concentration of the number of reads (a read count value) of a specific sub storage space (e.g., a specific memory block or a specific memory die) among sub storage spaces (e.g., memory blocks or memory dies) in a specific storage space (e.g., a superblock) of the memory device 110.

In addition, according to the embodiments of the present disclosure, it is possible to control the number of reads (read count values) of sub storage spaces (e.g., memory blocks or memory dies) in a specific storage space (e.g., a superblock) of the memory device 110 to increase, in a distributed manner.

According to the embodiments of the present disclosure, it is possible to prevent or delay a situation (a partial close situation) where a write operation to the entirety of a specific storage space (e.g., a superblock) of the memory device 110 becomes impossible due to frequent reading of some memory blocks BLK in the specific storage space (e.g., the superblock).

Although exemplary embodiments of the present disclosure have been described for illustrative purposes, those skilled in the art may appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted by the appended claims and encompass all equivalents falling within the scope of the appended claims.

What is claimed is:

1. A memory system comprising:
a memory device including a plurality of memory blocks; and
a memory controller configured to, in a write operation of first data into a superblock, check a read count value of a first memory block; and control, depending on the read count value of the first memory block, the first data to be programmed to one of the first memory block and a second memory block,
wherein the first memory block and the second memory block are included in the superblock.

2. The memory system according to claim 1,
wherein the memory controller checks, in the case where the first data is hot data, whether the read count value of the first memory block satisfies a predetermined specific condition,
wherein the memory controller controls, when the specific condition is not satisfied, the first data to be programmed to the first memory block, and
wherein the memory controller controls, when the specific condition is satisfied, the first data to be programmed to the second memory block.

3. The memory system according to claim 2, wherein the memory controller controls, in the case where the first data is cold data, the first data to be programmed to the first memory block.

4. The memory system according to claim 2,
wherein the memory controller determines, when the read count value of the first memory block is less than a threshold value, that the read count value of the first memory block does not satisfy the specific condition, and
wherein the memory controller determines, when the read count value of the first memory block is equal to or greater than the threshold value, that the read count value of the first memory block satisfies the specific condition.

5. The memory system according to claim 2,
wherein the memory controller determines, when a percentage occupied by the read count value of the first memory block over a total sum of read count values of memory blocks included in the superblock is less than a preset threshold percentage, that the read count value of the first memory block does not satisfy the specific condition, and
wherein the memory controller determines, when a percentage occupied by the read count value of the first memory block over the total sum is equal to or greater than the threshold percentage, that the read count value of the first memory block satisfies the specific condition.

6. The memory system according to claim 2, wherein the memory controller is further configured to control, when the specific condition is satisfied, data different from the first data to be programmed to the first memory block and configured to control the first data to be programmed to the second memory block when the second memory block becomes a current write-scheduled position.

7. The memory system according to claim 6, wherein the data different from the first data is dummy data or cold data.

8. The memory system according to claim 2, wherein the memory controller is further configured to:
- manage a mapping table between logical addresses and physical addresses;
- maintain, when the read count value of the first memory block does not satisfy the specific condition, a physical address mapped to a logical address of the first data in the mapping table, as a physical address of the first memory block; and
- change, when the read count value of the first memory block satisfies the specific condition, the physical address mapped to the logical address of the first data in the mapping table, to a physical address of the second memory block.

9. The memory system according to claim 2, wherein the memory controller is further configured to:
- check, when a write request of the first data is provided, a hot logical address list in which logical addresses for hot data are included; and
- determine, when a logical address of the first data is checked as being included in the hot logical address list, the first data as the hot data.

10. The memory system according to claim 1, wherein the memory device includes at least two memory dies, and the first memory block and the second memory block are positioned in different memory dies.

11. A memory controller comprising:
- a memory interface configured to communicate with a memory device including a plurality of memory blocks; and
- a control circuit configured to, in a write operation of first data into a superblock, check a read count value of a first memory block; and control, depending on the read count value of the first memory block, the first data to be programmed to one of the first memory block and to a second memory block,
- wherein the first memory block and the second memory block are included in the superblock.

12. The memory controller according to claim 11,
- wherein the control circuit checks, in the case where the first data is hot data, whether the read count value of the first memory block satisfies a predetermined specific condition,
- wherein the control circuit controls, when the specific condition is not satisfied, the first data to be programmed to the first memory block, and
- wherein the control circuit controls, when the specific condition is satisfied, the first data to be programmed to the second memory block.

13. The memory controller according to claim 12, wherein the control circuit controls, in the case where the first data is cold data, the first data to be programmed to the first memory block.

14. The memory controller according to claim 12,
- wherein the control circuit determines, when the read count value of the first memory block is less than a threshold value, that the read count value of the first memory block does not satisfy the specific condition, and
- wherein the control circuit determines, when the read count value of the first memory block is equal to or greater than the threshold value, that the read count value of the first memory block satisfies the specific condition.

15. The memory controller according to claim 12,
- wherein the control circuit determines, when a percentage occupied by the read count value of the first memory block over a total sum of read count values of memory blocks included in the superblock is less than a preset threshold percentage, that the read count value of the first memory block does not satisfy the specific condition, and
- wherein the control circuit determines, when a percentage occupied by the read count value of the first memory block over the total sum is equal to or greater than the threshold percentage, that the read count value of the first memory block satisfies the specific condition.

16. The memory controller according to claim 12, wherein the control circuit is further configured to control, when the specific condition is satisfied, data different from the first data to be programmed to the first memory block and configured to control the first data to be programmed to the second memory block when the second memory block becomes a current write-scheduled position.

17. The memory controller according to claim 16, wherein the data different from the first data is dummy data or cold data.

18. The memory controller according to claim 12, further comprising an address translation module configured to:
- manage a mapping table between logical addresses and physical addresses;
- maintain, when the read count value of the first memory block does not satisfy the specific condition, a physical address mapped to a logical address of the first data in the mapping table, as a physical address of the first memory block; and
- change, when the read count value of the first memory block satisfies the specific condition, the physical address mapped to the logical address of the first data in the mapping table, to a physical address of the second memory block.

19. The memory controller according to claim 12, wherein the control circuit is further configured to:
- check, when a write request of the first data is generated, a hot logical address list in which logical addresses for hot data are included; and
- determine, when a logical address for the first data is checked as included in the hot logical address list, the first data as the hot data.

20. A method for operating a memory system, the method comprising:
- checking a read count value of a first memory block in a memory device in a write operation of first data into a superblock; and
- programming, depending on the read count value of the first memory block, the first data to one of the first memory block and a second memory block,
- wherein the first memory block and the second memory block are included in the superblock.

* * * * *